United States Patent
Yamada et al.

(10) Patent No.: US 8,600,065 B2
(45) Date of Patent: Dec. 3, 2013

(54) STORAGE MEDIUM HAVING BREATH DETECTION PROGRAM STORED THEREIN AND BREATH DETECTION APPARATUS

(75) Inventors: Yoichi Yamada, Kyoto (JP); Junya Osada, Kyoto (JP); Arisa Hosaka, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 864 days.

(21) Appl. No.: 12/649,883

(22) Filed: Dec. 30, 2009

(65) Prior Publication Data

US 2011/0103596 A1    May 5, 2011

(30) Foreign Application Priority Data

Oct. 30, 2009    (JP) .................. 2009-250673

(51) Int. Cl.
*H04R 29/00* (2006.01)
(52) U.S. Cl.
USPC .................. 381/56; 704/253; 84/723; 84/616
(58) Field of Classification Search
USPC ................ 381/56–57, 122; 84/615, 616, 723; 704/253
See application file for complete search history.

(56) References Cited

U.S. PATENT DOCUMENTS

| | | | |
|---|---|---|---|
| 2006/0107824 A1* | 5/2006 | Bando et al. | 84/616 |
| 2010/0189268 A1* | 7/2010 | Haartsen et al. | 381/56 |
| 2010/0246834 A1* | 9/2010 | Lee | 381/56 |

FOREIGN PATENT DOCUMENTS

| | | |
|---|---|---|
| JP | 2006-145851 | 6/2006 |
| JP | 2007-094002 | 4/2007 |

* cited by examiner

*Primary Examiner* — Disler Paul
(74) *Attorney, Agent, or Firm* — Nixon & Vanderhye, P.C.

(57) ABSTRACT

Sound data acquisition means acquires, from a sound input device, sound data representing a sound signal. First evaluation means evaluates the sound signal represented by the sound data, by using a first criterion for detecting whether or not the sound inputted into the sound input device is a breath. Second evaluation means evaluates the sound signal represented by the sound data, by using a second criterion which is different from the first criterion. Breath detection means detects that a breath is inputted into the sound input device at least when the first evaluation means makes an affirmative evaluation, in a first period in which whether or not a breath is started to be blown into the sound input device is determined, and detects that a breath is inputted into the sound input device when at least one of the first evaluation means and the second evaluation means make an affirmative evaluation, in a second period in which whether or not a breath continues to be blown into the sound input device is determined.

18 Claims, 8 Drawing Sheets

STORAGE MEDIUM HAVING BREATH DETECTION PROGRAM STORED THEREIN AND BREATH DETECTION APPARATUS

CROSS REFERENCE TO RELATED APPLICATION

The disclosure of Japanese Patent Application No. 2009-250673, filed on Oct. 30, 2009, is incorporated herein by reference.

BACKGROUND OF THE INVENTION

1. Field of the Invention

The present invention relates to a storage medium having a breath detection program stored therein and a breath detection apparatus, and more particularly to a storage medium having stored therein a breath detection program used for, for example, detecting a sound inputted into a sound input device, and a breath detection apparatus.

2. Description of the Background Art

Conventionally, as disclosed in, for example, Japanese Laid-Open Patent Publication No. 2006-145851 (hereinafter, referred to as Patent Document 1), a game apparatus is known which detects an inputted sound based on a frequency distribution by analyzing waveform data of the inputted sound. For example, the game apparatus disclosed in Patent Document 1 analyzes waveform data of the inputted sound to calculate zero cross time intervals each of which represents a time interval between two zero cross points and acquire a frequency distribution represented by the waveform data, based on the calculated zero cross time intervals. Whether or not the inputted sound represents a user's breath is determined based on whether or not the obtained frequency distribution satisfies a predetermined criterion.

However, in general, in a case where a user continues to blow a breath into a sound input device such as a microphone, even when the breath of the constant level continues to be blown, the intensity of the breath tends to be gradually reduced. Therefore, in the game apparatus disclosed in Patent Document 1, it is difficult to set a criterion for detecting whether or not a sound being inputted is caused by the breath, throughout the whole period in which the breath continues to be blown. For example, in a case where the criterion for detecting for a breath is set relatively strict such that the starting of the breath blowing can be detected, even when the breath continues to be blown, the breath may not be detected when some time elapses after the starting of the breath blowing. On the other hand, in the game apparatus disclosed in Patent Document 1, in a case where the criterion for detecting for a breath is set relatively loose, even when a user is not blowing a breath, an input, other than a breath, to the sound input device, that is, a noise, an ambient sound, or the like, may be detected as a breath.

SUMMARY OF THE INVENTION

Therefore, an object of the present invention is to provide a storage medium having stored therein a breath detection program and a breath detection apparatus for appropriately detecting a blown breath.

In order to attain the objects mentioned above, the present invention has the following features.

A first aspect of the present invention is directed to a computer-readable storage medium having stored therein a breath detection program executed by a computer of an apparatus for detecting for a sound inputted into a sound input device. The breath detection program causes the computer to function as: sound data acquisition means; first evaluation means; second evaluation means; and breath detection means. The sound data acquisition means acquires, from the sound input device, sound data representing a sound signal. The first evaluation means evaluates the sound signal represented by the sound data, by using a first criterion for detecting whether or not the sound inputted into the sound input device is a breath. The second evaluation means evaluates the sound signal represented by the sound data, by using a second criterion which is different from the first criterion. The breath detection means detects that a breath is inputted into the sound input device at least when the first evaluation means makes an affirmative evaluation, in a first period in which whether or not a breath starts to be blown into the sound input device is determined, and detects that a breath is inputted into the sound input device when at least one of the first evaluation means and the second evaluation means make an affirmative evaluation, in a second period in which whether or not a breath continues to be blown into the sound input device is determined.

According to the above features, criteria to be used for the detection are different between in a period in which whether or not a breath starts to be blown into the sound input device is determined, and in a period in which whether or not a breath continues to be blown into the sound input device is determined, thereby enabling appropriate detection of a blown breath.

Further, the first evaluation means may evaluate the sound signal based on a magnitude of a sound represented by the sound signal. Furthermore, the second evaluation means may evaluate the sound signal based on a frequency distribution of the sound represented by the sound signal.

According to the above features, evaluation of the sound signal based on a magnitude of a sound is performed differently from evaluation of the sound signal based on a frequency distribution of the sound, thereby enabling appropriate detection of a blown breath based on the evaluation.

Further, the computer may be caused to further function as third evaluation means. The third evaluation means evaluates the sound signal based on the frequency distribution of the sound represented by the sound signal, by using a third criterion which is different from the first criterion and the second criterion. In this case, in the first period, the breath detection means may detect that a breath is inputted into the sound input device when each of the first evaluation means and the third evaluation means makes an affirmative evaluation, and the first evaluation means makes the affirmative evaluation based on the magnitude of the sound represented by the sound signal, and the third evaluation means makes the affirmative evaluation, based on the frequency distribution of the sound represented by the sound signal. Further, in the second period, the breath detection means may detect that a breath is inputted into the sound input device at least when the second evaluation means makes an affirmative evaluation, based on the frequency distribution of the sound represented by the sound signal.

According to the above features, in a period in which whether or not a breath starts to be blown into the sound input device is determined, the evaluation needs to be affirmative in both the evaluation based on the magnitude of the sound and the evaluation based on the frequency distribution of the sound. On the other hand, in a period in which whether or not a breath continues to be blown into the sound input device is determined, as long as the evaluation is affirmative in the evaluation based on the frequency distribution of a sound, it is detected that a breath is inputted. Therefore, a blown breath can be appropriately detected.

Further, the second evaluation means may include: time interval calculation means; time interval distribution generation means; and variation evaluation means. The time interval calculation means detects, based on the sound signal, zero cross points in a sound waveform representing the sound inputted into the sound input device, and calculates a time interval between continuous zero cross points so as to obtain a plurality of the time intervals. The time interval distribution generation means generates a distribution of the plurality of the time intervals calculated by the time interval calculation means. The variation evaluation means determines whether or not a variation among occurrence numbers in the distribution of the plurality of the time intervals is within a predetermined variation range. In this case, the second evaluation means may make an affirmative evaluation based on the second criterion, when the variation among the occurrence numbers in the distribution of the plurality of the time intervals is within the predetermined variation range.

According to the above features, it is possible to evaluate the sound signal by easily evaluating the frequency distribution of the sound represented by the sound signal.

Further, the first evaluation means may make an affirmative evaluation based on the first criterion, when a period in which the magnitude of the sound represented by the sound signal is greater than or equal to a predetermined magnitude is greater than or equal to a predetermined time period.

According to the above features, it is possible to evaluate the sound waveform represented by an input of a sound having a relatively increased magnitude, within a wide evaluation range.

Further, the first evaluation means may evaluate the sound signal based on a period in which the magnitude of the sound represented by the sound signal is greater than or equal to a predetermined magnitude. In this case, the second evaluation means may change a threshold value for evaluating a variation in the frequency distribution of the sound represented by the sound signal, based on the period evaluated by the first evaluation means.

According to the above features, a threshold value for evaluating the variation in the frequency distribution of the sound can be appropriately set depending on the magnitude of the sound represented by the sound signal.

Further, in a case where the first evaluation means affirmatively determines that the period in which the magnitude of the sound represented by the sound signal is greater than or equal to the predetermined magnitude indicates a value greater than or equal to a first threshold value, the second evaluation means may make an affirmative evaluation based on the second criterion if the variation among occurrence numbers in the frequency distribution of the sound represented by the sound signal indicates a value less than or equal to a second threshold value. In this case, in a case where the first evaluation means affirmatively determines that the period in which the magnitude of the sound represented by the sound signal is greater than or equal to the predetermined magnitude indicates a value greater than or equal to a third threshold value greater than the first threshold value, the second evaluation means makes an affirmative evaluation based on the second criterion if the variation among occurrence numbers in the frequency distribution of the sound represented by the sound signal indicates a value less than or equal to a fourth threshold value greater than the second threshold value.

According to the above features, a threshold value for evaluating the variation in the frequency distribution of the sound can be appropriately set depending on the magnitude of the sound represented by the sound signal.

Further, the computer may be caused to further function as zero cross point counting means. The zero cross point counting means detects, based on the sound signal, zero cross points in a sound waveform representing the sound inputted into the sound input device, and counts the number of the zero cross points in a predetermined period. In this case, in a case where the first evaluation means affirmatively determines that the period in which the magnitude of the sound represented by the sound signal is greater than or equal to the predetermined magnitude indicates a value greater than or equal to a fifth threshold value greater than the third threshold value, and the number of the zero cross points counted by the zero cross point counting means is greater than or equal to a predetermined number, the second evaluation means may make an affirmative evaluation based on the second criterion if the variation among occurrence numbers in the frequency distribution of the sound represented by the sound signal is less than or equal to a sixth threshold value greater than the fourth threshold value.

According to the above features, even when a substantially strong breath is inputted into the sound input device, the breath can be appropriately detected.

Further, the computer may be caused to further function as zero cross point counting means. The zero cross point counting means detects, based on the sound signal, zero cross points in a sound waveform representing the sound inputted into the sound input device, and counts the number of the zero cross points in a predetermined period. In this case, the first evaluation means may evaluate the sound signal based on a period in which the magnitude of the sound represented by the sound signal is greater than or equal to a predetermined magnitude. The breath detection means may detect that a breath is inputted into the sound input device, when the first evaluation means affirmatively determines that the period in which the magnitude of the sound represented by the sound signal is greater than or equal to the predetermined magnitude indicates a value greater than or equal to a predetermined threshold value, and the number of the zero cross points counted by the zero cross point counting means is greater than or equal to a predetermined number.

According to the above features, even when a substantially strong breath is inputted into the sound input device, the breath can be appropriately detected.

Further, the computer may be caused to further function as zero cross point counting means. The zero cross point counting means detects, based on the sound signal, zero cross points in a sound waveform representing the sound inputted into the sound input device, and counts the number of the zero cross points in a predetermined period. In this case, the second evaluation means may change a threshold value for evaluating a variation in the frequency distribution of the sound represented by the sound signal, depending on the number of the zero cross points counted by the zero cross point counting means.

According to the above features, even when a strong breath is inputted into the sound input device so as to increase the number of the zero cross points, the breath can be appropriately detected.

Further, the variation evaluation means may calculate an evaluation value by accumulating a difference between each of the occurrence numbers and an average of the occurrence numbers in the distribution of the plurality of the time intervals, and detect whether or not the evaluation value is less than or equal to a predetermined threshold value. In this case, the second evaluation means may make an affirmative evaluation based on the second criterion when the evaluation value is less than or equal to the predetermined threshold value.

According to the above features, the frequency distribution in the sound waveform can be appropriately evaluated.

Further, a second aspect of the present invention may be realized in a form of a breath detection apparatus including the respective means described above.

According to the present invention, criteria to be used for the detection are different between in a period in which whether or not a breath starts to be blown into the sound input device is determined, and in a period in which whether or not a breath continues to be blown into the sound input device is determined, thereby enabling appropriate detection of a blown breath.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
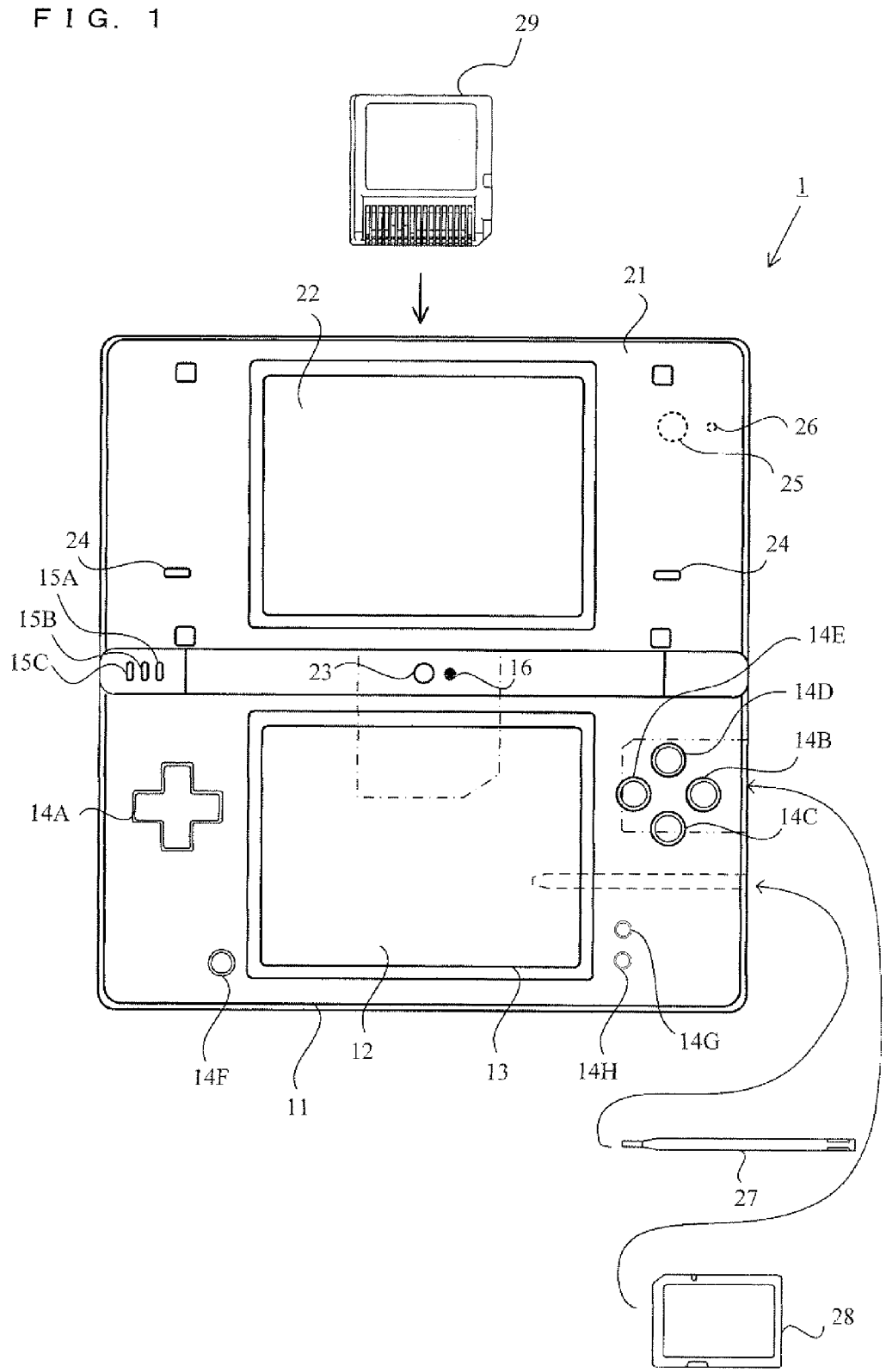
FIG. 1 is an external view of a game apparatus 1 for executing a breath detection program according to an embodiment of the present invention.

With reference to the drawings, a breath detection apparatus for executing a breath detection program according to an embodiment of the present invention will be described. The breath detection program of the present invention can be executed by any computer system, to be practically used. In the present embodiment, a game apparatus 1 is used as an exemplary breath detection apparatus, and the breath detection program is executed by the game apparatus 1. FIG. 1 is an external view of the game apparatus 1 for executing a game program exemplifying the breath detection program of the present invention. Here, a hand-held game apparatus is shown as an example of the game apparatus 1. The game apparatus 1, which includes a camera, functions as an imaging apparatus for taking an image by means of the camera, displaying the taken image on a screen, and storing data of the taken image.

FIG. 1 shows the game apparatus 1 which is a foldable hand-held game apparatus in an opened state. The game apparatus 1 has such a size as to be held by a player with both hands or one hand, even in the opened state.

The game apparatus 1 includes a lower housing 11 and an upper housing 21. The lower housing 11 and the upper housing 21 are connected to each other so as to be capable of being opened or closed (foldable). In an example of FIG. 1, the lower housing 11 and the upper housing 21 are each formed in a plate-like shape of a horizontally long rectangle, and foldably connected to each other at long side portions thereof. A player usually uses the game apparatus 1 in the opened state. When not using the game apparatus 1, the player keeps the game apparatus 1 in a closed state. In the example shown in FIG. 1, in addition to the closed state and the opened state, the game apparatus 1 can be maintained in a state where an angle between the lower housing 11 and the upper housing 21 is adjusted to any angle formed between the closed state and the opened state, by, for example, frictional force generated at a connection portion. In other words, the upper housing 21 can be stationary at any angle with respect to the lower housing 11.

In the lower housing 11, a lower LCD (Liquid Crystal Display) 12 is provided. The lower LCD 12 has a horizontally long shape, and is located such that a long side direction thereof corresponds to a long side direction of the lower housing 11. It is noted that although an LCD is used as a display device incorporated in the game apparatus 1 in the present embodiment, any other display device such as a display device using an EL (Electro Luminescence), or the like may be used. In addition, in the game apparatus 1, a display device of any resolution can be used.

In the lower housing 11, operation buttons 14A to 14K and a touch panel 13 are provided as input devices. As shown in FIG. 1, among the operation buttons 14A to 14K, the direction input button 14A, the operation button 14B, the operation button 14C, the operation button 14D, the operation button 14E, the power button 14F, the start button 14G, and the selection button 14H are provided on the inner main surface, of the lower housing 11, which is located inside when the upper housing 21 and the lower housing 11 are folded. The direction input button 14A is used, for example, for a selection operation, and the like. The operation buttons 14B to 14E are used, for example, for a determination operation, a cancellation operation, and the like. The power button 14F is used for powering the game apparatus 1 ON or OFF. In the example shown in FIG. 1, the direction input button 14A and the power button 14F are provided on the inner main surface of the lower housing 11 to one of the right and the left (to the left, in FIG. 1,) of the lower LCD 12 provided in the vicinity of the center of the inner main surface of the lower housing 11. Further, the operation buttons 142 to 14E, the start button 14G, and the selection button 14H are provided on the inner main surface of the lower housing 11 to the other of the left and the right (to the right, in FIG. 1,) of the lower LCD 12. The direction input button 14A, the operation buttons 14B to 14E, the start button 14G, and the selection button 14H are used for various operations performed on the game apparatus 1.

It is noted that the operation buttons 14I to 14K are not shown in FIG. 1. For example, the L button 14I is provided on the left end portion of the upper side surface of the lower housing 11, and the R button 14J is provided on the right end portion of the upper side surface of the lower housing 11. The L button 14I and the R button 14J are used, for example, for instructing the game apparatus 1 to perform a photographing operation (a shutter operation). The volume button 14K is provided on the left side surface of the lower housing 11. The volume button 14K is used for adjusting volume of speakers of the game apparatus 1.

The game apparatus 1 further includes the touch panel 13 as another input device in addition to the operation buttons 14A to 14K. The touch panel 13 is mounted so as to cover a screen of the lower LCD 12. In the present embodiment, the touch panel 13 is, for example, a resistive film type touch panel. However, the touch panel 13 is not limited to the resistive film type, but any press-type touch panel may be used. The touch panel 13 used in the present embodiment has the same resolution (detection accuracy) as that of the lower LCD 12, for example. However, the resolution of the touch panel 13 and the resolution of the lower LCD 12 may not necessarily be the same as each other. In the right side surface of the lower housing 11, an insertion opening (a dotted line shown in FIG. 1) for a touch pen 27 is provided. The insertion opening is capable of accommodating the touch pen 27 which is used for performing an operation on the touch panel 13. Although an input on the touch panel 13 is usually performed using the touch pen 27, a finger of a player, or the like can be used for operating the touch panel 13 in addition to the touch pen 27.

In the right side surface of the lower housing 11, an insertion opening (indicated by a two-dot chain line in FIG. 1) is provided for accommodating a memory card 28. Inside the insertion opening, a connector (not shown) is provided for electrically connecting the game apparatus 1 to the memory card 28. The memory card 28 is, for example, an SD (Secure Digital) memory card, and detachably mounted to the connector. The memory card 28 is used, for example, for storing an image taken by the game apparatus 1, and loading an image generated by another apparatus into the game apparatus 1.

Further, in the upper side surface of the lower housing 11, an insertion opening (indicated by a dashed-dotted line in FIG. 1) is provided for accommodating a memory card 29. Inside the insertion opening, a connector (not shown) is provided for electrically connecting the game apparatus 1 to the memory card 29. The memory card 29 is a storage medium in which a game program (the breath detection program) and the like are stored, and the memory card 29 is detachably mounted in the insertion opening provided in the lower housing 11.

Three LEDs 15A to 15C are mounted at the left side part of the connection portion where the lower housing 11 and the upper housing 21 are connected to each other. The game apparatus 1 is capable of performing wireless communication with another apparatus, and the first LED 15A is lit up while the wireless communication is established. The second LED 15B is lit up while the game apparatus 1 is charged. The third LED 15C is lit up while the power of the game apparatus 1 is ON. Thus, by the three LEDs 15A to 15C, a state of communication establishment of the game apparatus 1, a state of charge of the game apparatus 1, and a state of ON/OFF of the power of the game apparatus 1 can be indicated to a player.

Meanwhile, in the upper housing 21, an upper LCD 22 is provided. The upper LCD 22 has a horizontally long shape, and is located such that a long side direction thereof corresponds to a long side direction of the upper housing 21. Similarly to the lower LCD 12, a display device of another type or a display device having any resolution may be used instead of the upper LCD 22. A touch panel may be provided so as to cover the upper LCD 22.

In the upper housing 21, two cameras (the inner camera 23 and the outer camera 25) are provided. As shown in FIG. 1, the inner camera 23 is mounted on the inner main surface of the upper housing 21 and adjacent to the connection portion. On the other hand, the outer camera 25 is mounted on the surface reverse to the inner main surface on which the inner camera 23 is mounted, namely, on the outer main surface of the upper housing 21 (which is a surface located on the outside of the game apparatus 1 in the closed state, and the back surface of the upper housing 21 shown in FIG. 1). In FIG. 1, the outer camera 25 is indicated by a dashed line. Thus, the inner camera 23 is capable of taking an image in a direction in which the inner main surface of the upper housing 21 faces, and the outer camera 25 is capable of taking an image in a direction opposite to an imaging direction of the inner camera 23, namely, in a direction in which the outer main surface of the upper housing 21 faces. Thus, in the present embodiment, the two cameras, that is, the inner camera 23 and the outer camera 25 are provided such that the imaging directions thereof are opposite to each other. For example, a player can take an image of a scene as seen from the game apparatus 1 toward the player by using the inner camera 23 as well as an image of a scene as seen from the game apparatus 1 in a direction opposite to the player by using the outer camera 25. The lower LCD 12 and/or the upper LCD 22 may be used for displaying in real time an image being taken by the inner camera 23 or the outer camera 25.

In the inner main surface near the connection portion, a microphone (a microphone 43 shown in FIG. 2) as a sound input device is accommodated. In the inner main surface near the connection portion, a microphone hole 16 is formed to allow the microphone 43 to detect for a sound outside the game apparatus 1. The accommodating position of the microphone 43 and the position of the microphone hole 16 are not necessarily in the connection portion as described above. For example, the microphone 43 may be accommodated in the lower housing 11, and the microphone hole 16 may be provided in the lower housing 11 so as to correspond to the accommodating position of the microphone 43.

On the outer main surface of the upper housing 21, a fourth LED 26 (indicated by a dashed line in FIG. 1) is mounted. The fourth LED 26 is lit up while photographing is performed by using the inner camera 23 or the outer camera 25. Further, the fourth LED 26 may be caused to flash while a moving picture is taken by the inner camera 23 or the outer camera 25 (a taken image is stored as the moving picture). The fourth LED 26 may be OFF at the instant of the shutter being pressed, and the OFF state is kept until an image taken at the instant of the shutter being pressed has been stored, so as to prevent the LED from being included in the screen. By the fourth LED 26, it is notified to a subject person whose image is taken and people around the subject person that photographing is being performed by the game apparatus 1.

Sound holes 24 are formed in the inner main surface of the upper housing 21 to the right and the left of the upper LCD 22 provided in the vicinity of the center of the inner main surface of the upper housing 21. The speakers are accommodated in the upper housing 21 at the back of the sound holes 24, respectively. The sound holes 24 are holes for releasing sound from the speakers therethrough to the outside of the game apparatus 1.

As described above, the inner camera 23 and the outer camera 25 which are configurations for taking an image, and the upper LCD 22 which is display means for displaying various images are provided in the upper housing 21. On the other hand, the input devices (the touch panel 13 and the buttons 14A to 14K) for allowing an operation input to be performed on the game apparatus 1, and the lower LCD 12 which is display means for displaying various images are provided in the lower housing 11. Thus, for example, when using the game apparatus 1, a player can hold the lower housing 11 and perform an input to the input device while looking at a taken image (an image taken by the camera) displayed on the lower LCD 12 and/or the upper LCD 22.

Figure 2:
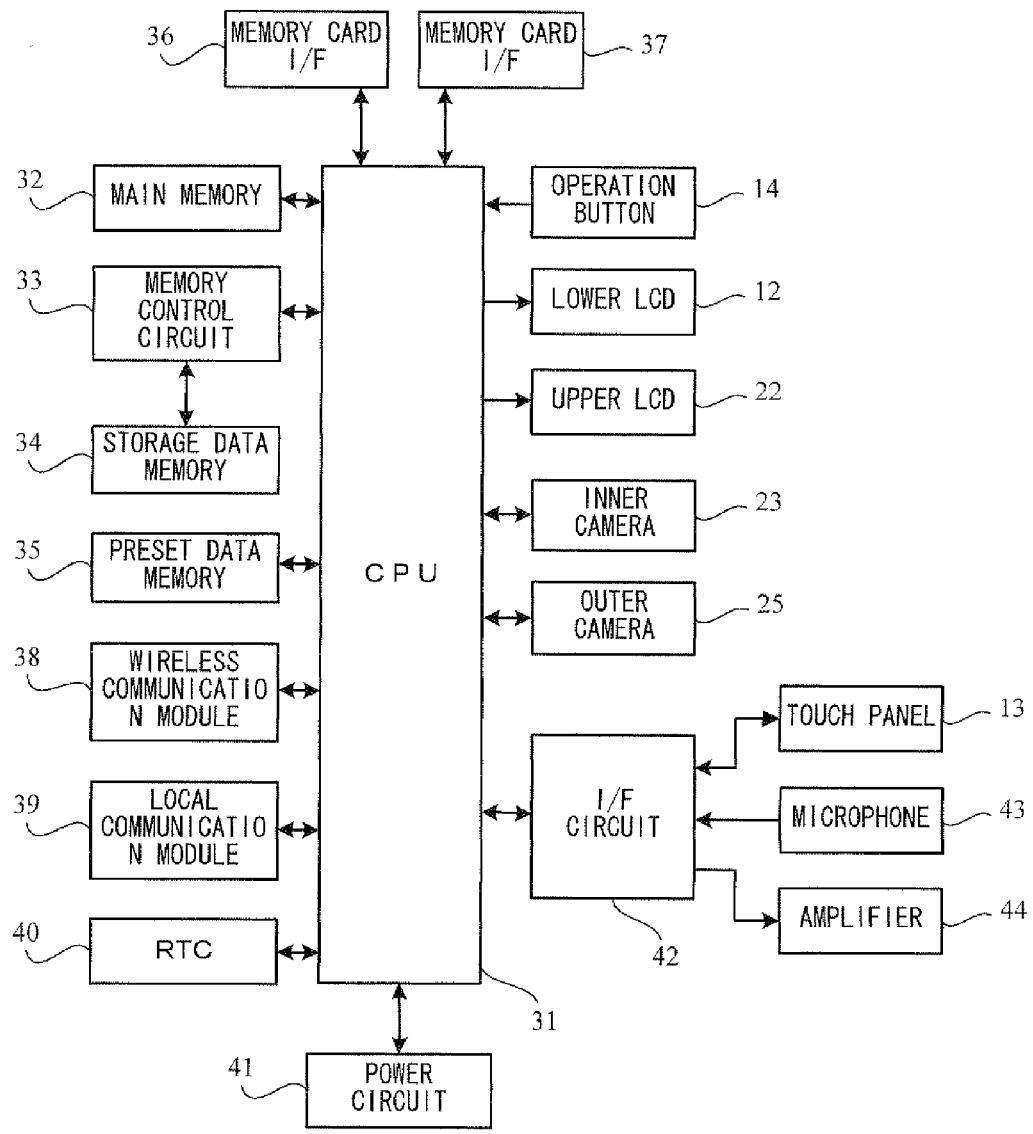
FIG. 2 is a block diagram illustrating an example of an internal configuration of the game apparatus 1 shown in FIG. 1.

An internal configuration of the game apparatus 1 will be described with reference to FIG. 2. FIG. 2 is a block diagram illustrating an example of the internal configuration of the game apparatus 1.

As shown in FIG. 2, the game apparatus 1 includes electronic components including a CPU 31, a main memory 32, a memory control circuit 33, a stored data memory 34, a preset data memory 35, memory card interfaces (memory card I/Fs) 36 and 37, a wireless communication module 38, a local communication module 39, a real time clock (RTC) 40, a power circuit 41, an interface circuit (I/F circuit) 42, and the like. These electronic components are mounted on an electronic circuit substrate and accommodated in the lower housing 11 (or may be accommodated in the upper housing 21).

The CPU 31 is information processing means for executing a predetermined program. In the present embodiment, the predetermined program is stored in a memory (e.g. the stored data memory 34) within the game apparatus 1 or in the memory cards 28 and/or 29, and the CPU 31 executes the breath detection process as described below by executing the predetermined program. It is noted that the program executed by the CPU 31 may be stored in advance in a memory within the game apparatus 1, may be loaded from the memory cards 28 and/or 29, or may be obtained from another apparatus through communication with the other apparatus.

The main memory 32, the memory control circuit 33, and the preset data memory 35 are connected to the CPU 31. The stored data memory 34 is connected to the memory control circuit 33. The main memory 32 is storage means used as a work area and a buffer area for the CPU 31. In other words, the main memory 32 stores various data used in the breath detection process, and also stores a program obtained from the outside (the memory cards 28 and 29, another apparatus, and the like). In the present embodiment, for example, a PSRAM (Pseudo-SRAM) is used as the main memory 32. The stored data memory 34 is storage means for storing the program to be executed by the CPU 31, data of images taken by the inner camera 23 and the outer camera 25, and the like. The stored data memory 34 is constructed of a nonvolatile storage medium, and the stored data memory 34 is constructed of, for example, a NAND flash memory in the present embodiment. The memory control circuit 33 is a circuit for controlling reading of data from the stored data memory 34 or writing of data into the stored data memory 34 in accordance with an instruction from the CPU 31. The preset data memory 35 is storage means for storing data (preset data) of various parameters which are preset in the game apparatus 1, and the like. A flash memory connected to the CPU 31 via an SPI (Serial Peripheral Interface) bus can be used as the preset data memory 35.

The memory card I/Fs 36 and 37 are connected to the CPU 31. The memory card I/F 36 performs reading of data from the memory card 28 mounted to the connector and writing of data into the memory card 28 mounted to the connector in accordance with the instruction from the CPU 31. On the other hand, the memory card I/F 37 performs reading of data from the memory card 29 mounted to the connector and writing of data into the memory card 29 mounted to the connector in accordance with the instruction from the CPU 31. In the present embodiment, various programs stored in the memory card 29 are read and executed by the CPU 31.

The breath detection program (game program) of the present invention may be supplied to a computer system via the memory card 29 as well as via an external storage medium such as the memory card 28. Further, the breath detection program of the present invention may be supplied to a computer system through a wired or wireless communication line. Furthermore, the breath detection program of the present invention may be stored in advance in a nonvolatile storage unit in the computer system. An information storage medium for storing the breath detection program of the present invention is not limited to the above-described nonvolatile storage unit, but may be a CD-ROM, a DVD, or an optical disc-shaped storage medium similar to them.

The wireless communication module 38 functions to connect to a wireless LAN, for example, by a method conformed to the standard of IEEE802.11.b/g. The local communication module 39 functions to wirelessly communicate with a game apparatus of the same type by a predetermined communication method. The wireless communication module 38 and the local communication module 39 are connected to the CPU 31. The CPU 31 is capable of receiving data from and sending data to another apparatus via the Internet using the wireless communication module 38, and capable of receiving data from and sending data to another game apparatus of the same type using the local communication module 39.

The RTC 40 and the power circuit 41 are connected to the CPU 31. The RTC 40 counts a time, and outputs the time to the CPU 31. For example, the CPU 31 is capable of calculating a current time (date), and the like based on the time counted by the RTC 40. The power circuit 41 controls electric power supplied from a power supply (typically, a battery accommodated in the lower housing 11) of the game apparatus 1 to supply the electric power to each component of the game apparatus 1.

The game apparatus 1 includes the microphone 43 and an amplifier 44. The microphone 43 and the amplifier 44 are connected to the I/F circuit 42. The microphone 43 detects for a sound inputted by a player toward the game apparatus 1, and outputs a sound signal indicative of the sound to the I/F circuit 42. The amplifier 44 amplifies the sound signal from the I/F circuit 42, and causes the speakers (not shown) to output the sound signal. The I/F circuit 42 is connected to the CPU 31.

The touch panel 13 is connected to the I/F circuit 42. The I/F circuit 42 includes a sound control circuit for controlling the microphone 43 and the amplifier 44 (the speakers), and a touch panel control circuit for controlling the touch panel 13. The sound control circuit performs A/D conversion or D/A conversion for the sound signal, and converts the sound signal into sound data of a predetermined format. The sound control circuit reads the sound signal from the microphone 43, and generates sound data every a predetermined time period. The CPU 31 is capable of recognizing a sound inputted into the microphone 43 by obtaining the sound data through the I/F circuit 42. The touch panel control circuit generates touch position data of a predetermined format based on a signal from the touch panel 13, and outputs the touch position data to the CPU 31. For example, the touch position data is data indicative of coordinates of a position at which an input is performed on an input surface of the touch panel 13. The touch panel control circuit reads a signal from the touch panel 13 and generates the touch position data every a predetermined time period. The CPU 31 is capable of recognizing a position at which an input is performed on the touch panel 13 by obtaining the touch position data through the I/F circuit 42.

An operation section 14 includes the above-described operation buttons 14A to 14K, and is connected to the CPU 31. The operation section 14 outputs, to the CPU 31, operation data indicating an input state (whether or not each button is pressed) of each of the operation buttons 14A to 14K. The CPU 31 obtains the operation data from the operation button 14, and executes processing in accordance with an input on the operation button 14.

The inner camera 23 and the outer camera 25 are connected to the CPU 31. Each of the inner camera 23 and the outer camera 25 takes an image in accordance with an instruction from the CPU 31, and outputs data of the taken image to the CPU 31. For example, the CPU 31 gives an instruction for imaging to one of the inner camera 23 or the outer camera 25, and the camera which has received the instruction for imaging takes an image and sends image data to the CPU 31.

The lower LCD 12 and the upper LCD 22 are connected to the CPU 31. Each of the lower LCD 12 and the upper LCD 22 displays an image thereon in accordance with an instruction from the CPU 31. For example, the CPU 31 displays, on the lower LCD 12 and/or the upper LCD 22, an image (for example, a game image) generated by the game program being executed. In another exemplary case, the CPU 31 displays, on one of the lower LCD 12 and the upper LCD 22, an image obtained from one of the inner camera 23 or the outer camera 25, and displays, on the other of the lower LCD 12 and the upper LCD 22, an operation explanation screen generated in a predetermined processing.

Figure 3:
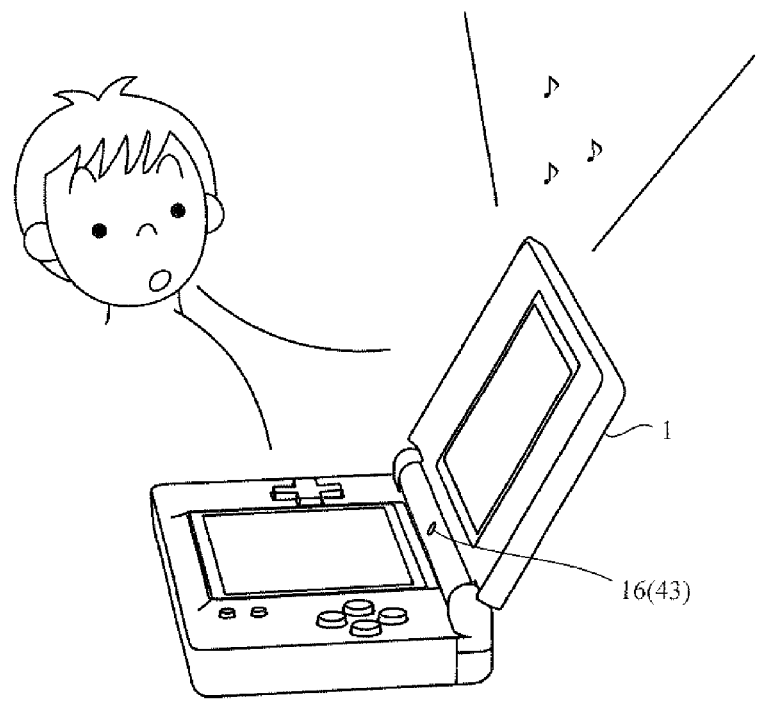
FIG. 3 illustrates an outline of an exemplary state in which a player is blowing a breath toward the game apparatus 1.
Figure 4:
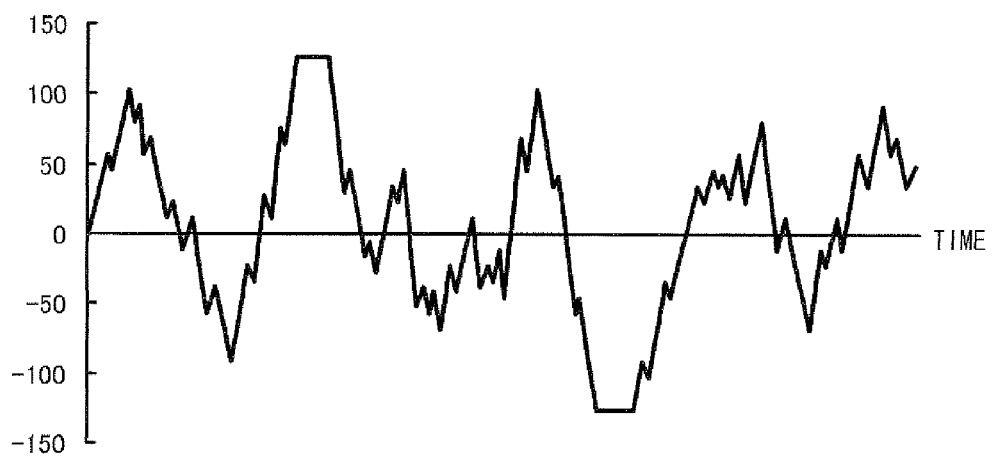
FIG. 4 shows a graph of an exemplary sound waveform representing an input from a microphone 43 shown in FIG. 2.
Figure 5:
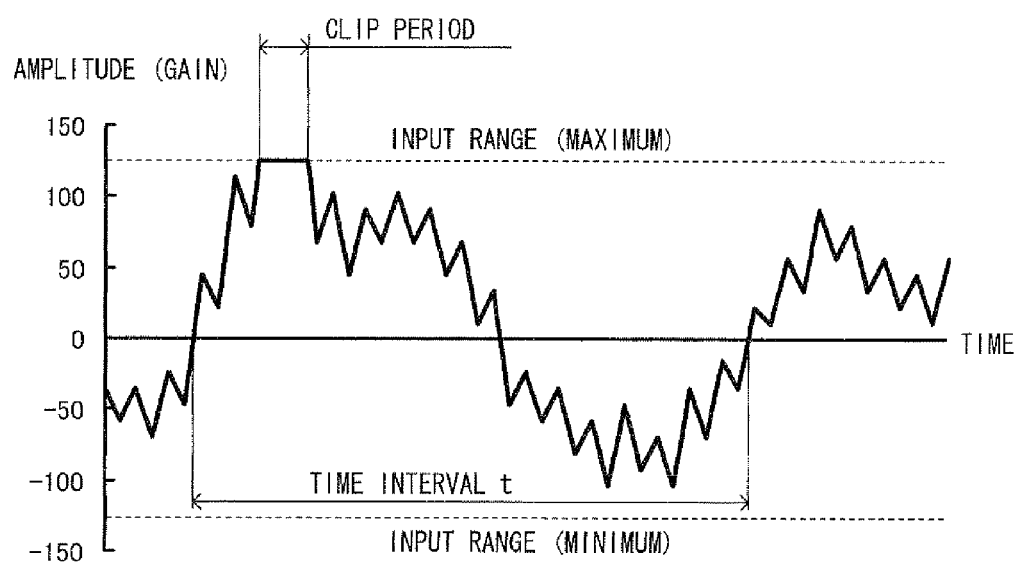
FIG. 5 is a graph partially showing an enlarged sound waveform shown in FIG. 4.

Next, an exemplary operation for detecting for a breath of a player will be described with reference to FIG. 3 to FIG. 5 before description of a specific process operation performed by the game apparatus 1 executing the game program. FIG. 3 illustrates an outline of an exemplary state in which a player is blowing a breath toward the game apparatus 1. FIG. 4 shows a graph of an exemplary sound waveform representing an input from the microphone 43. FIG. 5 is a graph which partially shows an enlarged sound waveform shown in FIG. 4.

As shown in FIG. 3, a player blows his/her breath toward the microphone 43 (the microphone hole 16) in order to allow the game apparatus 1 to detect for the breath of the player. On the other hand, the game apparatus 1 acquires sound data representing a sound signal of a sound inputted from the microphone 43 through the I/F circuit 42, and analyzes the sound data so as to detect whether or not the sound inputted from the microphone 43 represents a breath. When the game apparatus 1 detects that the sound inputted from the microphone 43 represents a breath, a process corresponding to the inputted breath is performed. For example, when the game apparatus 1 detects that the sound inputted from the microphone 43 represents a breath, a musical instrument, such as a wind instrument, a flute, or a harmonica, which is played by a breath being blown, and is positioned in a virtual world is played in accordance with the detected breath, and a sound corresponding to a played tone of the musical instrument is generated and outputted from the speakers. In another exemplary case, when the game apparatus 1 detects that the sound inputted from the microphone 43 represents a breath, a phenomenon corresponding to the detected breath is generated (for example, wind is blown, an object is moved, an object is rotated, fire is put out, a balloon is filled with air, temperature is lowered, a character is caused to perform a predetermined action) in the virtual world, and an image representing the virtual world is displayed on the lower LCD 12 and/or the upper LCD 22.

In the present embodiment, whether or not an inputted sound represents a blown breath is determined based on zero cross points in a sound waveform corresponding to the inputted sound. As shown in FIG. 4 and FIG. 5, in the sound waveform generated from a breath inputted into the microphone 43, points (zero cross points) at which the sound waveform crosses a zero level line appear when amplitudes (gains) represented in the sound waveform change from values of a plus range to values of a minus range, and from values of the minus range to values of the plus range. In the present embodiment, zero cross points at which amplitudes (gains) represented in the sound waveform change from values of the minus range to values of the plus range are utilized, and whether or not a breath is inputted is determined based on a time interval t between the zero cross points and the number of the zero cross points. Specifically, the time interval t described below is a time length defined by two consecutive zero cross points among the zero cross points at each of which an amplitude (gain) represented in the sound waveform changes from a value of the minus range to a value of the plus range. The time interval t is calculated as a cycle period (frequency) of each of waves of the sound waveform. Further, the number of the zero cross points is the number of the zero cross points at which amplitudes (gains) represented in the sound waveform change from values of the minus range to values of the plus range. The zero cross points at which amplitudes (gains) represented in a waveform changes from values of the plus range to values of the minus range may be utilized so as to calculate a time interval between the zero cross points and the number of the zero cross points.

The CPU 31 acquires sound data corresponding to the inputted sound at a predetermined sampling rate. Hereinafter, the sound data (the sound waveform) which is acquired by the CPU 31 every the predetermined sampling rate is referred to as a "sample". To be accurate, a sampling rate used by the game apparatus 1 is used also as a time unit of the time interval t. For example, when the sampling rate used by the CPU 31 is 1/8000 seconds (8 kHz), the time unit of the time interval t is also 1/8000 seconds. Therefore, the time interval t can be represented by the number of samples between consecutive zero cross points.

In the present embodiment, when a distribution of the time intervals t obtained in a certain period satisfies a predetermined criterion, a sound obtained in the certain period is detected as a breath. Specifically, the time intervals t obtained in the certain period are classified into a predetermined number (for example, three) of categories based on their time lengths. When a variation among the numbers of the time intervals t in the respective classified categories represents a value less than or equal to a predetermined threshold value, the sound obtained in the certain period is detected as a breath. That is, whether or not the sound is a breath is determined based on a frequency distribution of the sound obtained in a certain period. As apparent from the below description, the threshold value used for detecting the variation among the numbers of the time intervals t is preset based on data which is empirically obtained from an experiment or the like, and the threshold value may be changed depending on the obtained sound data (for example, depending on a magnitude of an amplitude of the sound signal, and/or the number of zero cross points).

Further, in the present embodiment, whether or not an inputted sound is a blown breath is detected also by using a magnitude of an amplitude (gain) represented in a sound waveform corresponding to the inputted sound. As shown in FIG. 4 and FIG. 5, in the sound waveform represented by a breath inputted into the microphone 43, the sound waveform has an amplitude changed depending on an intensity of the inputted breath or the like. In general, the more intense the breath inputted into the microphone 43, the greater an amplitude represented in the sound waveform. In the present embodiment, when a period in which an amplitude represented in the sound waveform has a value greater than or equal to a threshold value indicates a value greater than or equal to a predetermined threshold value, it is detected that a breath blowing into the microphone 43 is started.

For example, an input range is set for the microphone 43. A sound outside the input range is clipped and set as a maximum value or a minimum value of the input range. Specifically, when the input range from −128 to +127 is set for the microphone 43, a sound input representing a value greater than +127 is clipped and set as +127, and a sound input representing a value less than −128 (that is, a sound input of a minus value having an absolute value greater than 128) is clipped and set to −128. For example, when a period (clip period) in which the sound input is clipped is greater than or equal to a predetermined period, it is detected that the breath blowing is started. As described above, the sound data corresponding to the inputted sound is acquired at a predetermined sampling rate. Therefore, the clip period is also represented based on the sampling rate. Accordingly, the clip period can be represented as the number of clipped samples. The criterion for detecting that the breath blowing is started may not be based on the number of samples obtained in the clip period. The criterion may be based on the number of samples in which amplitudes represented in the sound waveform each have a magnitude greater than or equal to a predetermined magnitude, regardless of whether or not the samples are clipped.

In a case where a player continues to blow a breath into the microphone 43, even when the breath of the constant level continues to be blown, the intensity of the breath tends to be gradually reduced. Therefore, in a case where the criterion for detecting for a breath is set relatively strict so as to detect starting of the breath blowing, the breath which continues to be blown may not be detected as a breath, that is, an erroneous detection may be made, when some time elapses after the starting of the breath blowing. On the other hand, a case where the criterion for detecting for a breath is set relatively loose will be described. In this case, when a player does not blow a breath, an input, other than a breath, inputted into the microphone 43, that is, a noise, an ambient sound, or the like may be erroneously detected as a breath. In order to cope with those problems, in the present embodiment, criteria are set so as to be different between in a period (hereinafter, referred to as a breath blowing starting period) in which a breath blowing is started and in a period (hereinafter, referred to as a breath blowing continuing period) in which the breath continues to be blown after the breath blowing starting period.

In the present embodiment, in the breath blowing starting period, it is necessary to affirmatively determine that a breath is inputted in a first evaluation using a first criterion, in order to detect that a breath is inputted into the microphone 43. On the other hand, in the breath blowing continuing period, as long as it is affirmatively determined that a breath is inputted in at least one of the first evaluation using the first criterion and a second evaluation using a second criterion, it is detected that a breath is inputted into the microphone 43. For example, in the breath blowing starting period, in order to detect that a breath is inputted into the microphone 43, it is necessary to affirmatively determine that a breath is inputted, in an evaluation (the first evaluation) based on an amplitude represented in the sound waveform. More typically, in the breath blowing starting period, when it is affirmatively determined that a breath is inputted, in an evaluation (the second evaluation) based on a frequency distribution in the sound waveform in addition to the first evaluation, it is detected that a breath is inputted into the microphone 43. On the other hand, in the breath blowing continuing period, as long as it is affirmatively determined that a breath is inputted, in an evaluation (the second evaluation) based on a frequency distribution in a sound waveform, it is detected that a breath is inputted into the microphone 43. In a particular case, when it is detected that a substantially strong breath is inputted, in the evaluation (the first evaluation) based on the amplitude represented in the sound waveform, it may be detected that a breath is inputted, without performing the second evaluation. For example, in the first evaluation, whether or not a breath is inputted is determined based on whether or not a period in which an amplitude represented in a sound waveform has a value greater than or equal to a threshold value indicates a value greater than or equal to a predetermined threshold value (that is, whether or not the first criterion is satisfied). In the second evaluation, whether or not a breath is inputted is determined based on whether or not a variation among occurrence numbers in frequency distribution in the sound waveform indicates a value less than or equal to a predetermined threshold value (that is, whether or not the second criterion is satisfied). Thus, an evaluation needs to be affirmative in at least the first evaluation (in a typical case, evaluations need to be affirmative in the first evaluation and the second evaluation) in order to detect that a breath is inputted in the breath blowing starting period. On the other hand, in the breath blowing continuing period, as long as an evaluation is affirmative in the second evaluation, it is detected that a breath is inputted. Thus, when criteria for detecting for a breath are set so as to be different depending on a period in which a breath is being blown, it is possible to cope with a problem that an intensity of a breath tends to be gradually reduced, and to prevent an erroneous detection as described above.

In another exemplary case, in the breath blowing starting period, when an evaluation is affirmative in an evaluation (the first evaluation) using a threshold value representing a relatively strict criterion for determining whether or not a sound waveform represents a breath blowing input, it is detected that a breath is inputted into the microphone 43. On the other hand, in the breath blowing continuing period, when an evaluation is affirmative in an evaluation (the second evaluation) using a threshold value representing a relatively loose criterion for determining whether or not a sound waveform represents a breath blowing input, it is detected that a breath is inputted into the microphone 43. For example, in the first evaluation, whether or not a breath is inputted is determined based on whether or not a variation among occurrence numbers in frequency distribution in a sound waveform indicates a value less than or equal to a first threshold value (whether or not the first criterion is satisfied). In the second evaluation, whether or not a breath is inputted is determined based on whether or not a variation among occurrence numbers in frequency distribution in a sound waveform indicates a value less than or equal to a second threshold value which is greater than the first threshold value (whether or not the second criterion is satisfied). Thus, in the breath blowing starting period, an evaluation needs to be affirmative in the first evaluation using a threshold value representing a relatively strict criterion, in order to detect that a breath is inputted. On the other hand, in the breath blowing continuing period, when an evaluation is affirmative in the first evaluation or an evaluation is affirmative in the second evaluation using a threshold value representing a relatively loose criterion, it is detected that a breath is inputted. Thus, criteria for detecting for a breath are set so as to be different depending on a period in which a breath is being blown, thereby preventing the erroneous detection as described above.

Further, a sound waveform obtained when a breath is inputted through the microphone 43 has a characteristic to be distinguished from another sound input. Specifically, frequencies represented by a sound waveform obtained when a breath is inputted tend to be widely distributed, that is, the frequencies represented by the sound waveform are not distributed in specific frequency bandwidths, and an amplitude (gain) tends to be increased. Further, in a sound waveform obtained when a breath is inputted, when the inputted breath is relatively intense, an amplitude (gain) is relatively increased, and the number of the zero cross points per unit time is relatively increased. On the other hand, in a sound waveform obtained when a voice of a player is inputted into the microphone 43, the frequencies are distributed in specific frequency bandwidths depending on the voice, and an amplitude (gain) tends to be reduced as compared to a breath input. Further, in a sound waveform obtained when a noise occurs, the frequencies are distributed in specific high frequency bandwidths depending on the noise, and the number of the zero cross points per unit time is substantially increased, and an amplitude (gain) tends to be reduced as compared to a breath input. Furthermore, in a sound waveform of an impact sound caused by, for example, a collision of objects or by an object being tapped, the sound is temporarily or intermittently inputted, frequencies are temporarily distributed in specific frequency bandwidths depending on the impact sound, and an amplitude (gain) is temporarily increased in the sound input as compared to a breath input, but the clip period is reduced since the amplitude is temporarily increased in the sound input. In the present embodiment, in order to distinguish a sound waveform of a breath from those sound waveforms, whether or not a breath is inputted is determined by changing, depending on a magnitude (amplitude) of the sound input, a threshold value for evaluating the frequency distribution. However, a sound input having an amplitude outside a predetermined range is clipped. Therefore, for the clipped sound waveform, a clip period (the number of times the clipping is performed) is regarded as a magnitude of the sound input. An example in which each threshold value is determined, and a sound waveform is evaluated based on the threshold value will be described below.

Figure 6:
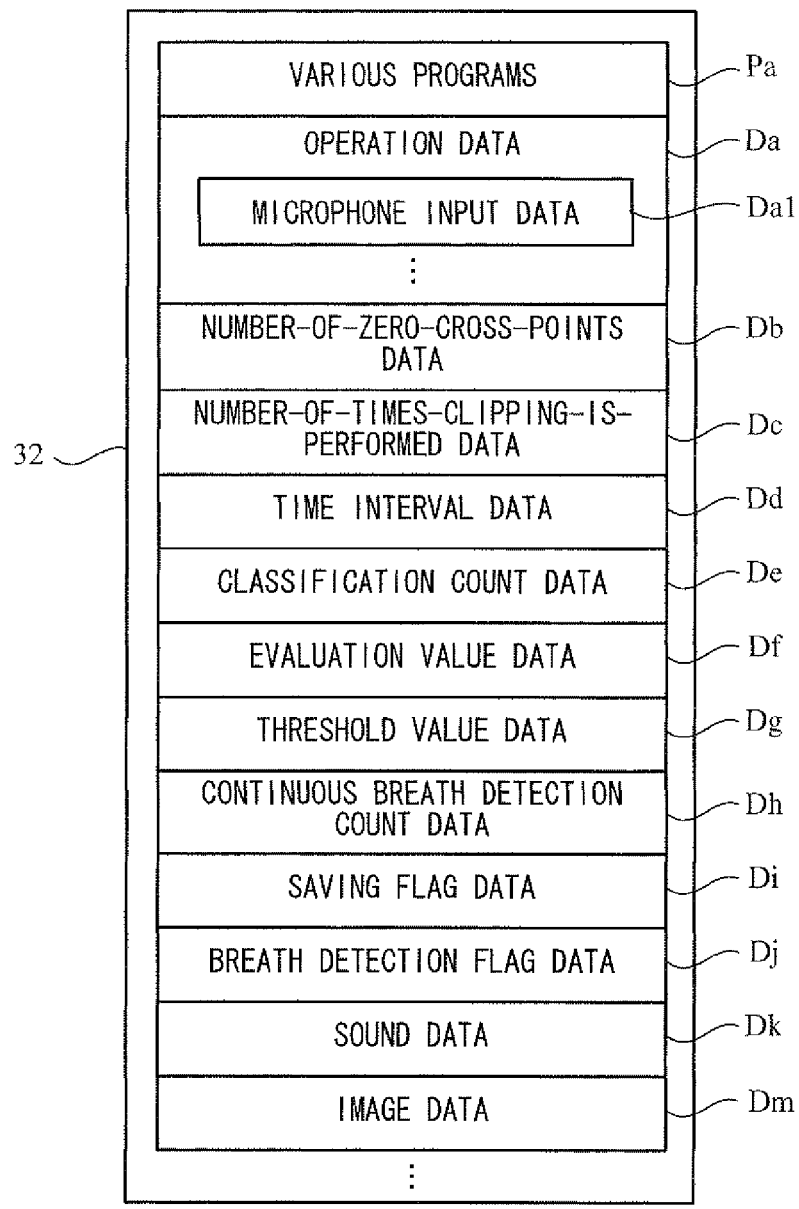
FIG. 6 is a diagram illustrating examples of various data to be stored in a main memory 32 in accordance with a game program being executed.
Figure 7:
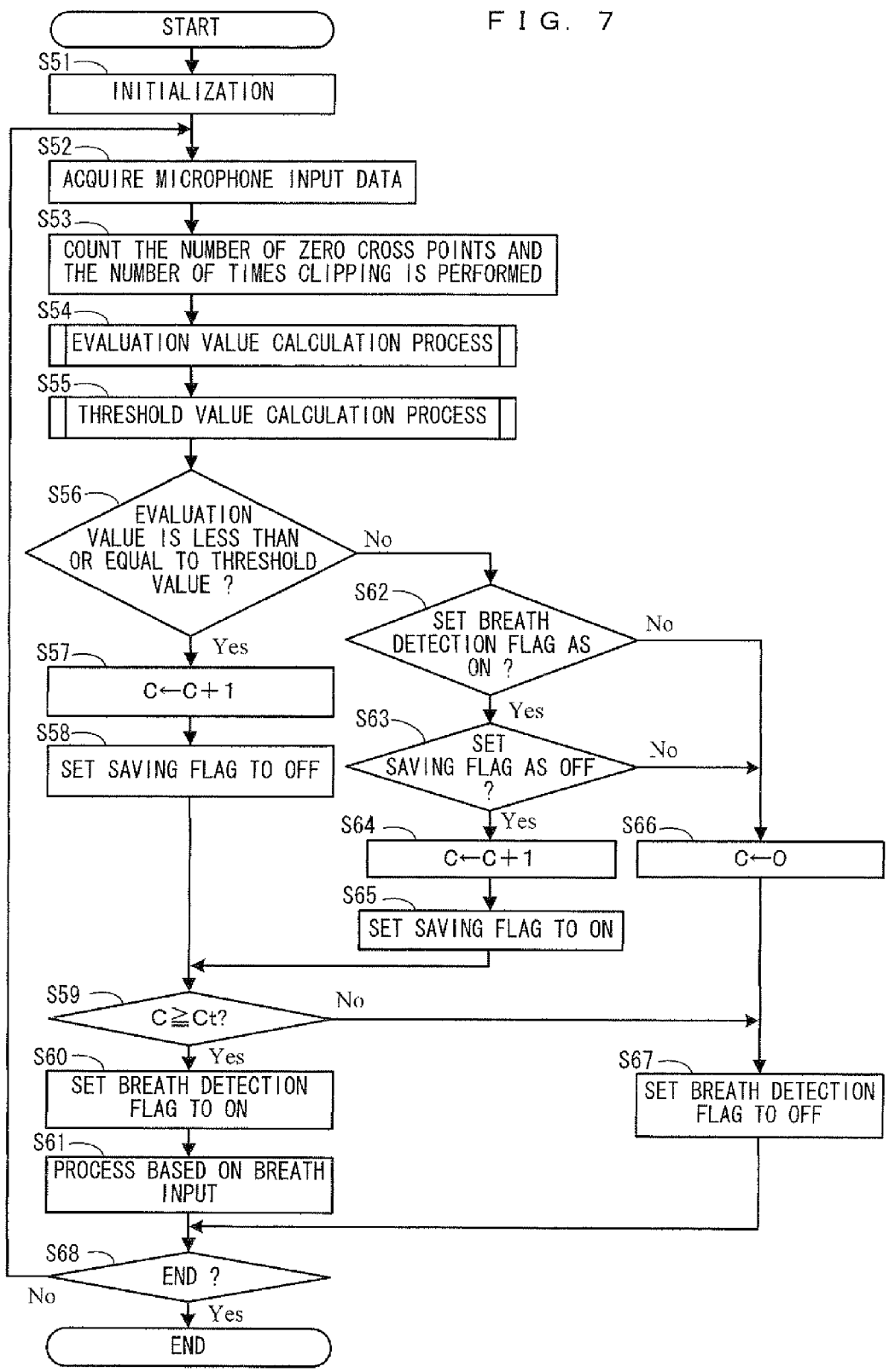
FIG. 7 is a flow chart showing an exemplary game process performed by the game apparatus 1 executing the game program.
Figure 8:
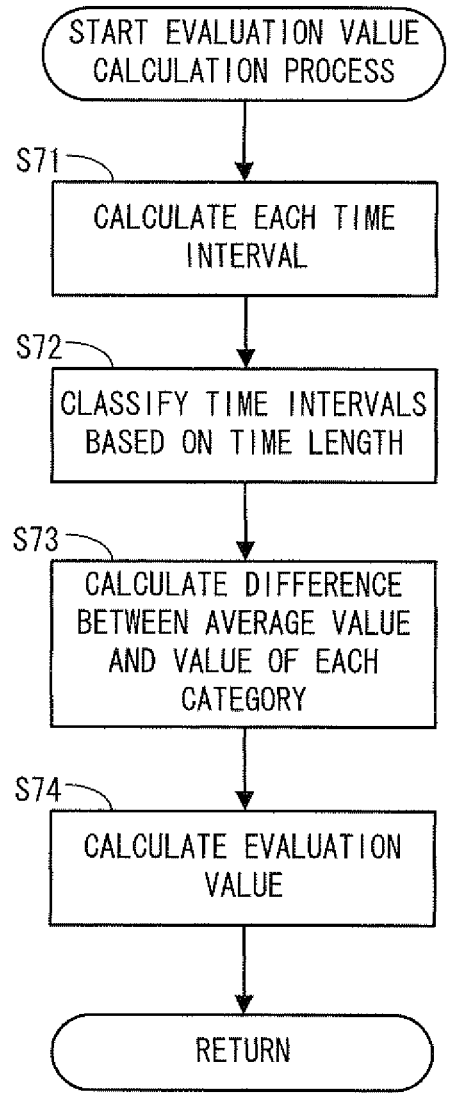
FIG. 8 shows in detail a sub-routine of an exemplary evaluation value calculation process of step 54 shown in FIG. 7.
Figure 9:
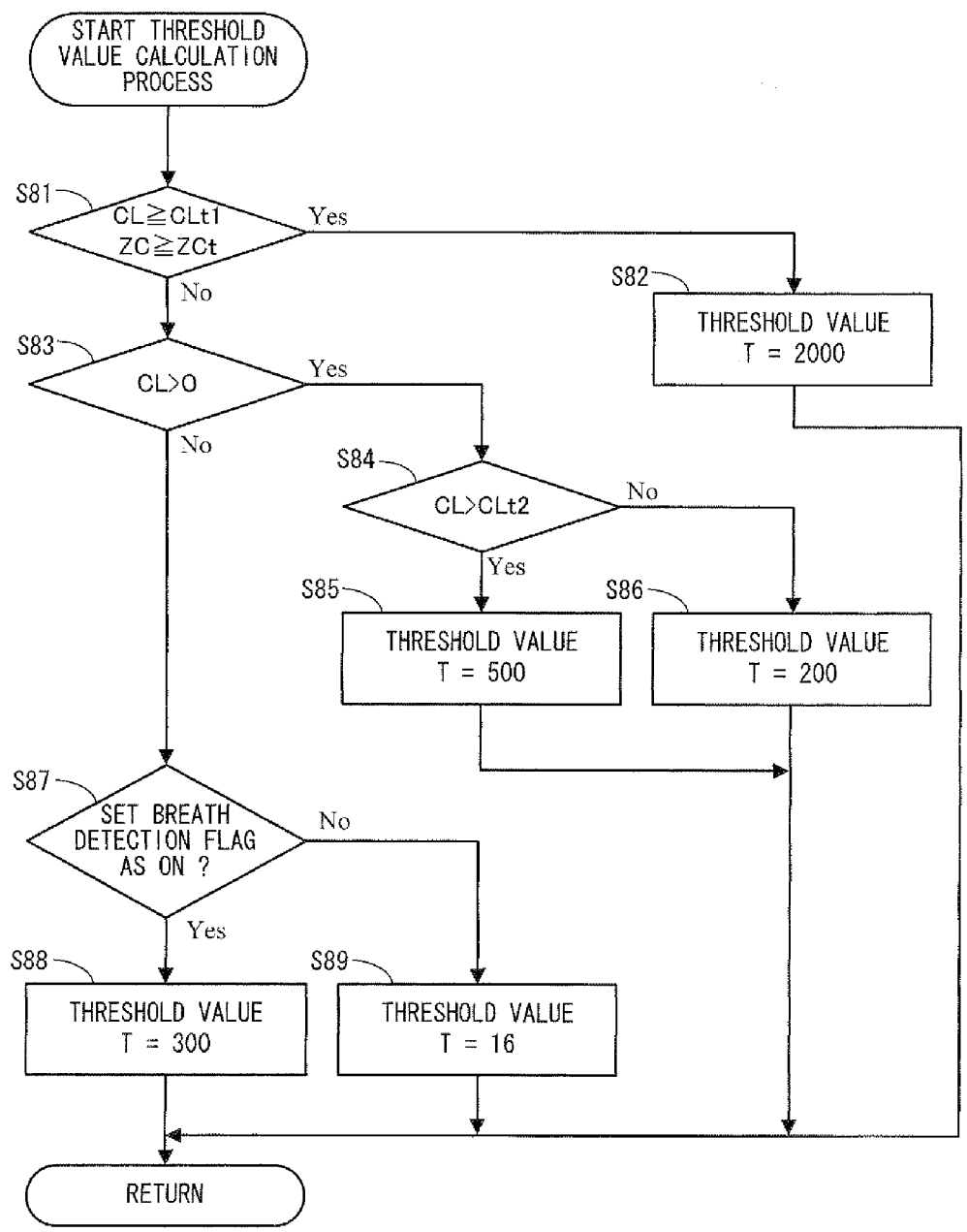
FIG. 9 shows in detail a sub-routine of an exemplary threshold value calculation process of step 55 shown in FIG. 7.

Next, with reference to FIG. 6 to FIG. 9, a specific process operation based on a game program executed by the game apparatus 1 will be described. FIG. 6 is a diagram illustrating examples of various data to be stored in the main memory 32 in accordance with the game program being executed. FIG. 7 is a flow chart showing an exemplary game process performed by the game apparatus 1 executing the game program. FIG. 8 shows in detail a sub-routine of an exemplary evaluation value calculation process of step 54 shown in FIG. 7. FIG. 9 shows in detail a sub-routine of an exemplary threshold value calculation process of step 55 shown in FIG. 7. Programs for executing the processes are stored in a memory (for example, the stored data memory 34) incorporated in the game apparatus 1, the memory card 28, or the memory card 29. When the game apparatus 1 is powered on, the program is loaded into the main memory 32 from the memory card 28 or the memory card 29 through the memory card I/F 36 or the memory card I/F 37, respectively, or from the incorporated memory, and the CPU 31 executes the program.

In FIG. 6, the main memory 32 stores programs loaded from the incorporated memory, the memory card 28, or the memory card 29, and stores data which are temporarily generated in the breath detection process. In a data storage region of the main memory 32, stored are operation data Da, the number-of-zero-cross-points data Db, the number-of-times-clipping-is-performed data Dc, time interval data Dd, classification count data De, evaluation value data Df, threshold value data Dg, continuous breath detection count data Dh, saving flag data Di, breath detection flag data Dj, sound data Dk, image data Dm, and the like. Further, in a program storage region of the main memory 32, various programs Pa forming a game program (the breath detection program) are stored.

The operation data Da represents an operation performed on the game apparatus 1 by a player. For example, the operation data Da includes microphone input data Da1. The microphone input data Da1 is sound data corresponding to a sound waveform which represents a sound inputted into the microphone 43. For example, the microphone input data Da1 is sound data (sample) obtained at a sampling rate (for example, every 1/8000 seconds) for the microphone 43, and the microphone input data Da1 is used every unit time (one frame: for example, 1/60 seconds) based on which the game apparatus 1 performs a game process. In the present embodiment, the microphone input data Da1 may include sound data corresponding to at least one frame. Therefore, the microphone input data Da1 may be deleted immediately after the microphone input data Da1 has been used, and the sound data having been obtained at the sampling rate after the deletion may be chronologically stored until the sound data having been obtained after the deletion is used in the immediately following process. Further, the sound data of the microphone input data Da1 may be updated in the FIFO method such that the sound data corresponding to the most recent one frame is stored as the microphone input data Da1. As described above, a cycle period in which the sound data is obtained and stored as the microphone input data Da1 is different from a cycle period in which the game is processed. Therefore, the microphone input data Da1 includes sound data having been obtained at plural time points. In the following description, the game process is performed by using sound data received in the most recent predetermined period (for example, the sound data for one frame), among sound data having been received at plural time points.

The number-of-zero-cross-points data Db represents the number of zero cross points in the sound waveform which is represented by the microphone input data Da1, and corresponds to the most recent one frame. The number-of-times-clipping-is-performed data Dc represents a clip period (the number of clipped samples) in the sound waveform which is represented by the microphone input data Da1, and corresponds to the most recent one frame. The time interval data Dd represents each time interval t in the sound waveform which is represented by the microphone input data Da1, and corresponds to the most recent one frame.

The classification count data De represents, when the time intervals t represented by the time interval data Dd are classified into a predetermined number (for example, three) of categories based on their time lengths, the number of the time intervals t classified into each category. For example, when the time intervals t are classified into three categories, that is, a short time interval category, an intermediate time interval category, and a long time interval category, the classification count data De represents the number (a short time interval number Nts) of the time intervals t belonging to the short time interval category, the number (an intermediate time interval number Ntm) of the time intervals t belonging to the intermediate time interval category, and the number (a long time interval number Ntl) of the time intervals t belonging to the long time interval category. The evaluation value data Df represents an evaluation value E for evaluating a frequency distribution in the sound waveform corresponding to the most recent one frame, based on the number of the time intervals t, which is included in each category and is represented by the classification count data De. The threshold value data Dg represents a threshold value T set for determining whether or not the evaluation value E represents a breath.

The continuous breath detection count data Dh represents the number of times (the number C of times a breath is detected) the sound waveform representing an inputted sound is continuously detected as a breath. The saving flag data Di represents a saving flag which is set to ON when the sound waveform which represents an inputted sound and has been detected as a breath is not detected as a breath. The breath detection flag data Dj represents a breath detection flag which is set to ON when the sound waveform representing an inputted sound is detected as a breath.

The sound data Dk represents a sound to be generated by the game apparatus 1 in accordance with a breath being inputted. The image data Dm represents an image to be displayed as a game image by the game apparatus 1.

Next, an operation performed by the game apparatus 1 will be described with reference to FIG. 7. Firstly, when power (power button 14F) of the game apparatus 1 is ON, the CPU 31 executes a boot program (not shown), so that a game program stored in the incorporated memory, or the memory card 28 or 29 is loaded into the main memory 32. The loaded game program is executed by the CPU 31, and each step shown in FIG. 7 (a step is abbreviated as "S" in FIG. 7 to FIG. 9) is executed.

In FIG. 7, the CPU 31 performs initialization for the game process in step 51, and advances the process to the subsequent step. For example, the CPU 31 initializes the respective parameters stored in the main memory 32 such that each parameter has a predetermined value or is in a predetermined state, in the initialization of step 51. For example, the CPU 31 sets, to OFF, each of the flags represented by the saving flag data Di and the breath detection flag data Dj. In the initialization of step 51, the CPU 31 initializes the virtual world (for example, sets the virtual world, sets a background, sets a display region, and positions each object), and displays, on the upper LCD 22 and/or the lower LCD 12, the virtual world corresponding to the display region having been set.

Next, the CPU 31 obtains, in step 52, sound data (samples) which corresponds to the most recent one frame, and which is represented by the microphone input data Da1, and advances the process to the subsequent step.

Next, the CPU 31 counts, in step 53, the number-of-zero-cross-points ZC and the number-of-times-clipping-is-performed CL based on the sound waveform represented by the sound data obtained in step 52, and advances the process to the subsequent step. For example, the CPU 31 counts, as the number-of-zero-cross-points ZC, the number of points at which amplitudes (gains) in the sound waveform which corresponds to one frame and which is represented by the sound data obtained in step 52 indicate zero level when the level enters the plus range from the minus range, and updates the number-of-zero-cross-points data Db by using the number-of-zero-cross-points ZC having been counted. Further, the CPU 31 counts, as the number-of-times-clipping-is-performed CL, the number of samples in each of which clipped is an amplitude (gain) represented in the sound waveform which corresponds to one frame and which is represented by the sound data obtained in step 52, and updates the number-of-times-clipping-is-performed data Dc by using the number-of-times-clipping-is-performed CL having been counted. For example, when the input range set for the microphone 43 ranges from −128 to +127, the CPU 31 counts, as the number-of-times-clipping-is-performed CL, the number of samples indicating values less than or equal to −126 or greater than or equal to +126 among the sound data (samples) obtained in step 52.

Next, the CPU 31 performs the evaluation value calculation process in step 54, and advances the process to the subsequent step. Hereinafter, the evaluation value calculation process of step 54 will be described with reference to FIG. 8.

In FIG. 8, the CPU 31 calculates, in step 71, the time intervals t based on the sound waveform represented by the sound data obtained in step 52, and advances the process to the subsequent step. The time interval t represents a time length defined between two consecutive zero cross points among the zero cross points at which amplitudes (gains) represented in the sound waveform change from values of the minus range to values of the plus range, and the time lengths based on all the zero cross points detected in the sound waveform are calculated. The CPU 31 updates the time interval data Dd by using the respective time intervals t having been calculated.

Next, the CPU 31 classifies the time intervals t having been calculated in step 71, into a predetermined number of categories, based on the time length, and counts the number of the time intervals t in each category in step 72, and advances the process to the subsequent step. For example, the CPU 31 classifies the time intervals t into three categories, that is, the short time interval category (for the time interval t which is less than or equal to 13 samples), the intermediate time interval category (for the time interval t which is greater than or equal to 14 samples, and is not greater than 41 samples), the long time interval category (for the time interval t which is greater than or equal to 42 samples). The CPU 31 counts, based on the time intervals t calculated in step 71, the number (the short time interval number Nts) of the time intervals t belonging to the short time interval category, the number (the intermediate time interval number Ntm) of the time intervals t belonging to the intermediate time interval category, and the number (the long time interval number Ntl) of the time intervals t belonging to the long time interval category, and updates the classification count data De by using the result of the counting.

Next, the CPU 31 calculates a difference between an average value and the counted number of the time intervals t belonging to each category in step 73, and calculates, in step 74, a total value of the respective differences, as the evaluation value E, and ends the process of the sub-routine. Specifically, the CPU 31 calculate the average value Av by using the following equation.

$$Av = ZC/Cn$$

wherein ZC indicates the number-of-zero-cross-points ZC counted in step 53, and is represented by the number-of-zero-cross-points data Db, and Cn represents the number of categories into which the time intervals t are classified in step 72, and, in the above-described example, Cn=3 is satisfied. The CPU 31 calculates the difference (Dnts, Dntm, Dntl) between the average value Av and the counted number of the time intervals t belonging to each category (the short time interval number Nts, the intermediate time interval number Ntm, the long time interval number Ntl) by using the following equations.

$$Dnts = |Av - Nts| * S$$

$$Dntm = |Av - Ntm| * S$$

$$Dntl = |Av - Ntl| * S$$

wherein S represents a coefficient indicating a scale value, and S is set so as to satisfy, for example, S=16. The CPU 31 calculates the evaluation value E by using the following equation.

$$E = Dnts + Dntm + Dntl$$

The CPU 31 updates the evaluation value data Df by using the calculated evaluation value E.

Returning to FIG. 7, after the evaluation value calculation process of step 54, the CPU 31 performs the threshold value calculation process in step 55, and advances the process to the subsequent step. Hereinafter, the threshold value calculation process of step 55 will be described with reference to FIG. 9.

In FIG. 9, the CPU 31 determines, in step 81, whether or not the number-of-times-clipping-is-performed CL is greater than or equal to a predetermined number of times (CLt1), and the number-of-zero-cross-points ZC is greater than or equal to a predetermined number (ZCt). When the number-of-times-clipping-is-performed CL≥the predetermined number of times CLt1, and the number-of-zero-cross-points ZC≥the predetermined number ZCt are satisfied, the CPU 31 advances the process to step 82. On the other hand, when the number-of-times-clipping-is-performed CL<the predetermined number of times CLt1 is satisfied, or the number-of-zero-cross-points ZC<the predetermined number ZCt is satisfied, the CPU 31 advances the process to step 83. The number-of-times-clipping-is-performed CL and the number-of-zero-cross-points ZC, which are counted in step 53, are represented by the number-of-times-clipping-is-performed data Dc and the number-of-zero-cross-points data Db, respectively. Further, the predetermined number of times CLt1 and the predetermined number ZCt are threshold values for evaluating the number-of-times-clipping-is-performed CL and the number-of-zero-cross-points ZC, respectively, in the breath detection process, and the predetermined number of times CLt1 and the predetermined number ZCt are set so as to satisfy, for example, the predetermined number of times CLt1=100 and the predetermined number ZCt=31, respectively.

In step 82, the CPU 31 sets the threshold value T to 2000, and updates the threshold value data Dg, and ends the process of the sub-routine.

On the other hand, in step 83, the CPU 31 determines whether or not the number-of-times-clipping-is-performed CL is greater than 0, that is, whether or not the clipping has been performed. When the number-of-times-clipping-is-performed CL>0 is satisfied, the CPU 31 advances the process to step 84. On the other hand, when the number-of-times-clipping-is-performed CL=0 is satisfied, the CPU 31 advances the process to step 87.

In step 84, the CPU 31 determines whether or not the number-of-times-clipping-is-performed CL is greater than a predetermined number of times (CLt2). When the number-of-times-clipping-is-performed CL>the predetermined number of times CLt2 is satisfied, the CPU 31 sets the threshold value T to 500, and updates the threshold value data Dg in step 85, and ends the process of the sub-routine. On the other hand, when the number-of-times-clipping-is-performed CL≤ the predetermined number of times CLt2 is satisfied, the CPU 31 sets the threshold value T to 200, and updates the threshold value data Dg in step 86, and ends the process of the sub-routine. The predetermined number of times CLt2 is a threshold value for evaluating the number-of-times-clipping-is-performed CL in the breath detection process, and the predetermined number of times CLt2 is set so as to satisfy, for example, the predetermined number of times CLt2=90.

On the other hand, in step 87, the CPU 31 determines whether or not the breath detection flag is set as ON based on the breath detection flag data Dj. When the breath detection flag is set as ON, the CPU 31 sets the threshold value T to 300, and updates the threshold value data Dg in step 88, and ends the process of the sub-routine. On the other hand, when the breath detection flag is set as OFF, the CPU 31 sets the threshold value T to 16, and updates the threshold value data Dg in step 89, and ends the process of the sub-routine.

Returning to FIG. 7, after the threshold value calculation process of step 55, the CPU 31 determines whether or not the evaluation value E is less than or equal to the threshold value T, in step 56. When the evaluation value E is less than or equal to the threshold value T, the CPU 31 detects that the sound waveform of the inputted sound represents a breath, and advances the process to step 57. On the other hand, when the evaluation value E is greater than the threshold value T, the CPU 31 detects that the sound waveform of the inputted sound does not represent a breath, and advances the process to step 62. The CPU 31 performs the determination of step 56 by using the evaluation value E represented by the evaluation value data Df, and the threshold value T represented by the threshold value data Dg.

In step 57, the CPU 31 increments the number-of-times-breath-is-detected C by 1, and updates the number-of-times-breath-is-detected C, and advances the process to the subsequent step. For example, the CPU 31 increments, by 1, the number-of-times-breath-is-detected C represented by the continuous breath detection count data Dh, and updates the continuous breath detection count data Dh by using the number-of-times-breath-is-detected C obtained through the increment.

Next, the CPU 31 sets the saving flag to OFF, and updates the saving flag data Di in step 58, and advances the process to the subsequent step.

Next, the CPU 31 determines whether or not the number-of-times-breath-is-detected C is greater than or equal to a predetermined number of times (Ct) in step 59. When the number-of-times-breath-is-detected C≥the predetermined number of times Ct is satisfied, the CPU 31 advances the process to step 60. On the other hand, when the number-of-times-breath-is-detected C<the predetermined number of times Ct is satisfied, the CPU 31 advances the process to step 67. The predetermined number of times Ct is a threshold value for determining whether the current time point is in the breath blowing starting period or in the breath blowing continuing period. For example, when the breath blowing starting period is set as two frame period after the starting of the breath blowing, the predetermined number of times Ct is set so as to satisfy the predetermined number of times Ct=2.

In step 60, the CPU 31 sets the breath detection flag to ON, and updates the breath detection flag data Dj, and advances the process to the subsequent step.

Next, the CPU 31 performs a process to be performed when an inputted sound is a breath, in step 61, and advances the process to step 68. For example, the CPU 31 performs a process for displaying, on the lower LCD 12 and/or the upper LCD 22, an image in which a musical instrument positioned in the virtual world is played, by using the image data Dm, and a process for generating and outputting by a speaker a sound based on the played tone of the musical instrument, by using the sound data Bk. In another exemplary case, the CPU 31 performs a process for generating, by using the image data Dm, an image in which a phenomenon based on the detected breath occurs in the virtual world, and displaying, on the lower LCD 12 and/or the upper LCD 22, an image representing the virtual world.

On the other hand, when the CPU 31 determines that the evaluation value E is greater than the threshold value T (No in step 56), the CPU 31 determines whether or not the breath detection flag is set as ON, based on the breath detection flag data Dj, in step 62. When the breath detection flag is set as ON, the CPU 31 advances the process to step 63. On the other hand, when the breath detection flag is set as OFF, the CPU 31 advances the process to step 66.

In step 63, the CPU 31 determines whether or not the saving flag is set as OFF, based on the saving flag data Di. When the saving flag is set as OFF, the CPU 31 advances the process to step 64. On the other hand, when the saving flag is set as ON, the CPU 31 advances the process to step 66.

In step 64, the CPU 31 increments the number-of-times-breath-is-detected C by 1, and updates the number-of-times-breath-is-detected C, and advances the process to the subsequent step. For example, the CPU 31 increments, by 1, the number-of-times-breath-is-detected C represented by the continuous breath detection count data Dh, and updates the continuous breath detection count data Dh by using the number-of-times-breath-is-detected C obtained through the increment.

Next, the CPU 31 sets the saving flag to ON, and updates the saving flag data Di in step 65, and advances the process to step 59.

On the other hand, in step 66, the CPU 31 updates the number-of-times-breath-is-detected C so as to indicate 0, and advances the process to the subsequent step. For example, the CPU 31 updates the number-of-times-breath-is-detected C represented by the continuous breath detection count data Dh so as to indicate 0.

Next, the CPU 31 sets the breath detection flag to OFF, and updates the breath detection f lag data Dj in step 67, and advances the process to step 68.

In step 68, the CPU 31 determines whether or not the game process is to be ended. For example, when the game being currently processed is over, or when a player performs an operation for ending the game, it is determined that the game process is to be ended. When the game process is not to be ended, the CPU 31 returns the process to step 52 and repeats the process. On the other hand, when the game process is to be ended, the CPU 31 ends the process of the flow chart.

Next, a relationship between each process operation described above and the breath detection process will be described.

As apparent from process steps of step 56 to step 61, the game apparatus 1 detects that an inputted sound is a breath when the evaluation value E is less than or equal to the threshold value T. That is, the less the threshold value T is, the more difficult it is to detect that the inputted sound is a breath. In the threshold value calculation process shown in FIG. 9, the threshold value T set in step 89 is minimized. Further, the process step of step 89 is performed when the number-of-times-clipping-is-performed CL for the sound waveform representing the inputted sound is 0 (No in step 83), and the breath detection flag is set as OFF (No in step 87). In other words, the process step of step 89 is performed when the sound is not detected as a breath in the immediately preceding process, or when the current time point is in the breath blowing starting period. That is, in a case where the sound is not detected as a breath in the immediately preceding process, or in a case where the current time point is in the breath blowing starting period, unless an amplitude (gain) represented in the sound waveform of the inputted sound has a magnitude greater than or equal to a predetermined magnitude, a strict criterion is used for evaluation based on a frequency distribution in the sound waveform. In the present embodiment, the threshold value T is set, in step 89, so as to satisfy the threshold value T=16. The evaluation value E seldom becomes less than or equal to the threshold value T set in step 89. This is known from an empirical value obtained from an experiment and the like. Therefore, a player needs to blow a strong breath such that an amplitude (gain) represented in the sound waveform of an inputted sound has a magnitude greater than or equal to a predetermined magnitude, in order to allow the game apparatus 1 to detect an input of a breath at the start of the breath blowing. As described above, in step 89, the threshold value T is set to a value based on which the evaluation is seldom affirmative in step 56. However, the threshold value T may be set to a value (for example, a negative value) based on which the evaluation is always negative in step 56. Also in this case, a player needs to blow a strong breath such that an amplitude (gain) represented in the sound waveform of the inputted sound has a magnitude greater than or equal to a predetermined magnitude, in order to allow the game apparatus 1 to detect an input of a breath at the start of the breath blowing.

On the other hand, when the number-of-times-clipping-is-performed CL for the sound waveform of an inputted sound is 0 (No in step 83), and the breath detection flag is set as ON (Yes in step 87), that is, when the current time point is in the breath blowing continuing period in which the sound is detected as a breath in the immediately preceding process, the threshold value T is set, in step 88, to a value which is greater than a value set in step 89 such that the threshold value T=300 is satisfied. Thus, in a case where the current time point is in the breath blowing continuing period, even when an amplitude (gain) represented in the sound waveform of the inputted sound does not have a magnitude greater than or equal to a predetermined magnitude, the inputted sound which is detected as a breath input in the evaluation based on a frequency distribution in the sound waveform is handled as a breath input. In the sound waveform obtained from the breath blowing, frequencies are not distributed in specific frequency bandwidths, and frequencies tend to be widely distributed, as compared to a sound waveform obtained when a voice of a player is inputted into the microphone 43, or an input waveform generated due to a noise. Therefore, the evaluation value E for the sound waveform obtained by a breath input tends to be reduced, and the threshold value T set in step 88 is a threshold value for detecting that such a sound waveform represents a breath input. As described above, in the breath blowing continuing period, it may be detected that the sound waveform indicating an amplitude less than a predetermined amplitude represents a breath. Therefore, even when the blown breath is gradually weakened, it is possible to appropriately detect for an input of a breath.

Further, in the process steps of step 62 to step 65, even when the evaluation value E is greater than the threshold value T, the game apparatus 1 detects an inputted sound as a breath. The process steps are performed for allowing the game apparatus 1 to detect, even when a breath is not detected in one frame period, that a breath is being also inputted in the one frame period, in a period (the breath blowing continuing period) in which a breath continues to be blown after the game apparatus 1 has detected that the inputted sound is a breath. For example, in a case where, even when a player blows a breath into the game apparatus 1, the game apparatus 1 erroneously detects that no breath is inputted, due to a noise or the like, a saving process is performed such that it is detected in the one frame period only that a breath is being inputted. When the saving process is to be performed for a period longer than one frame period, a time at which the saving flag is set to ON in step 65 may be delayed in accordance with a desired period for which the saving process is to be continued.

Further, in the threshold value calculation process of step 55, the threshold value T used for the evaluation based on the frequency distribution is changed depending on a magnitude (amplitude) of a sound input. An amplitude, of a sound input, which is outside a predetermined range is clipped. Therefore, for the clipped sound waveform, the clip period (the number-of-times-clipping-is-performed CL) is handled as the magnitude of the sound input. Hereinafter, the sound waveform to be identified based on the threshold value T set in the threshold value calculation process of step 55 will be described.

The threshold value T set in the process steps of step 82 to step 86 is used for evaluating the sound waveform obtained when the number-of-times-clipping-is-performed CL is greater than or equal to 1, that is, when a relatively strong breath is inputted into the microphone 43. On the other hand, the threshold value T set in the process steps of step 87 to step 89 is used for evaluating the sound waveform obtained when the number-of-times-clipping-is-performed CL is 0, that is, when a relatively weak breath is inputted into the microphone 43.

For example, when a sound for which 1≤ the number-of-times-clipping-is-performed CL≤ the predetermined number of times CLt2 is satisfied, is inputted into the microphone 43, the threshold value T is set in step 86 such that the threshold value T=200 is satisfied. As described above, in the sound waveform obtained from the breath input, frequencies are not distributed in specific frequency bandwidths, but frequencies tend to be widely distributed, as compared to a sound waveform obtained when a voice of a player is inputted into the microphone 43, or an input waveform generated due to a noise. Therefore, the evaluation value E for the sound waveform obtained from the breath input tends Lobe reduced. Therefore, the threshold value T set in step 86 is a threshold value for detecting that such a sound waveform represents a breath input. Although the evaluation value E for the sound waveform obtained from the breath input tends to be reduced, the waveform has a non-regular form. Therefore, the threshold value T is set, in step 86, based on an empirical value obtained from an experiment and the like, so as to detect a breath input even when the evaluation value E is somewhat increased.

Further, when a sound for which the number-of-times-clipping-is-performed CL is greater than the predetermined number of times CLt2 is inputted into the microphone 43, the threshold value T is set in step 85 such that the threshold value T=500 is satisfied. In the sound waveform obtained from a breath input, frequencies tend to be widely distributed, as compared to a sound waveform obtained when a voice of a player is inputted into the microphone 43, or an input waveform generated due to a noise. As described above, increase of strength of an inputted breath increases the number of zero cross points. The increase of the number of zero cross points increases a variation among occurrence numbers in frequency distribution, so that the evaluation value E tends to be increased. Therefore, the threshold value T is set, in step 85, based on an empirical value obtained from an experiment and the like, such that it is possible to detect a breath input even when the evaluation value E is somewhat increased due to the crease of the strength of the inputted breath causing the increase of the number of zero cross points.

When a breath having its strength substantially increased is inputted into the microphone 43, the time intervals t tend to be classified mainly into a relatively shorter time interval category (for example, the short time interval category), and it is difficult to distinguish, based on the frequency distribution only, a sound waveform of a breath input from a sound waveform obtained when a voice of a player is inputted into the microphone 43 or an input waveform generated due to a noise. Therefore, the threshold value T is set, in step 82, based on an empirical value obtained from an experiment and the like, such that the threshold value T=2000 is satisfied, so that a breath input is almost always detected, based on the frequency distribution (that is, detection based on the evaluation value E). On the other hand, based on an empirical value obtained from an experiment and the like, criteria (specifically, the number-of-times-clipping-is-performed CL is greater than or equal to 100, and the number-of-zero-cross-points ZC is greater than or equal to 31) based on the number-of-times-clipping-is-performed CL and the number-of-zero-cross-points ZC are set such that the criteria are easily reached by the breath having its strength substantially increased, but are not easily reached by a voice of a player or an ambient sound, thereby discriminating a breath having substantially increased strength from another input. As described above, the threshold value T is set, in step 82, as a value based on which the evaluation of step 56 is almost always affirmative. However, the threshold value T may be set as a value (for example, an infinitely great value) based on which the evaluation of step 56 is always affirmative. In this case, whether or not a breath is inputted is detected, based on only the number-of-times-clipping-is-performed CL and the number-of-zero-cross-points ZC, regardless of a result of an evaluation based on frequency distribution in the sound waveform.

Further, when a relatively weak sound for which the number-of-times-clipping-is-performed CL is 0 is inputted into the microphone 43, the threshold value T is set in step 89 such that the threshold value T=16 is satisfied, in the breath blowing starting period (when the breath detection flag is set as OFF). When a relatively weak breath which generates no clipping is inputted into the microphone 43, the number of the zero cross points is relatively reduced. Due to the reduction of the number of the zero cross points, the variation among occurrence numbers in the frequency distribution may be irregular. In order to detect such a sound waveform as a sound waveform obtained from a breath input, the irregularity of the variation among occurrence numbers in the frequency distribution needs to be considered, so that an erroneous detection may be caused. As described above, in order to prevent the erroneous detection, when the threshold value T is set to an extremely small value in the breath blowing starting period, it is known, based on an empirical value obtained from an experiment and the like, that a breath input is not detected in almost all cases based on the frequency distribution. That is, at the start of the breath blowing, in order to allow the game apparatus 1 to detect a breath input, a player needs to blow a strong breath such that an amplitude (gain) represented in the sound waveform of an inputted sound has a magnitude greater than or equal to a predetermined magnitude.

On the other hand, when a relatively weak sound for which the number-of-times-clipping-is-performed CL is 0 is inputted into the microphone 43, the threshold value T is set, in step 88, such that the threshold value T=300 is satisfied, in the breath blowing continuing period (when the breath detection flag is set as ON). This is because, in the sound waveform obtained from the breath input, frequencies are not distributed in specific frequency bandwidths, and frequencies tend to be widely distributed, as compared to a sound waveform obtained when a voice of a player is inputted into the microphone 43, or an input waveform generated due to a noise, as described above. Therefore, the evaluation value E for the sound waveform of an inputted breath tends to be reduced, and the threshold value T set in step 88 is a threshold value for detecting that such a sound waveform represents a breath input. That is, in the breath blowing continuing period, even when an amplitude (gain) represented in the sound waveform of an inputted sound does not have a magnitude greater than or equal to a predetermined magnitude, if it is detected that a breath is inputted based on a frequency distribution in the sound waveform, the inputted sound is handled as a breath input.

In the breath blowing starting period, in order to allow the game apparatus 1 to detect that an inputted sound is a breath by the threshold value T being set as described above, an evaluation in the breath input detection based on an amplitude (gain) represented in the sound waveform is required to be affirmative. On the other hand, in the breath blowing continuing period, when an evaluation is affirmative in at least one of the breath input detection based on an amplitude (gain) represented in the sound waveform, and the breath input detection based on a frequency distribution, the inputted sound is detected as a breath. Specifically, when the number-of-times-clipping-is-performed CL is 0 (No in step 83), that is, when an evaluation is negative in the breath input detection based on an amplitude (gain) represented in the sound waveform, if the breath detection flag is set as ON (Yes in step 87), that is, if the current time point is in the breath blowing continuing period, the threshold value T is set such that an evaluation is affirmative in the breath input detection based on the frequency distribution. That is, in the breath blowing continuing period, even when an evaluation is negative in the breath input detection based on an amplitude (gain) represented in the sound waveform, if an evaluation is affirmative in the breath input detection based on the frequency distribution, it is detected that a breath is inputted. On the other hand, when the number-of-times-clipping-is-performed CL is 0 (No in step 83), that is, when an evaluation is negative in the breath input detection based on an amplitude (gain) represented in the sound waveform, if the breath detection flag is set as OFF (No in step 87), that is, if the current time point is in the breath blowing starting period, the threshold value T is set such that an evaluation is almost always or always negative in the breath input detection based on the frequency distribution. In other words, in the breath blowing starting period, when an evaluation is negative in the breath input detection based on an amplitude (gain) represented in the sound waveform, it is detected that a breath is not inputted.

Further, the threshold value T is set in step 82 such that an evaluation is almost always or always affirmative in the evaluation based on the frequency distribution. Therefore, in practice, a sound is detected as a breath in the evaluation based on the number-of-times-clipping-is-performed CL and the number-of-zero-cross-points ZC. The threshold value T is set in step 82 regardless of whether the breath detection flag is set as ON or OFF, that is, regardless of whether the current time point is in the breath blowing starting period or the breath blowing continuing period. Therefore, as long as each of the number-of-times-clipping-is-performed CL and the number-of-zero-cross-points ZC satisfies a predetermined condition, it is detected that a breath is inputted, regardless of the evaluation based on the frequency distribution in the sound waveform, in either the breath blowing starting period or the breath blowing continuing period.

In other words, in the breath blowing starting period, in order to detect that a breath is inputted into the microphone 43, the evaluation needs to be affirmative (Yes in step 81 or Yes in step 83) in the evaluation (the first evaluation) based on an amplitude represented in the sound waveform. Further, in the breath blowing starting period, except in a case where an input breath is strong enough to set the threshold value T in step 82, when the evaluation (the evaluation of step 56 using the threshold value T set in step 85 or step 86; the second evaluation) based on the frequency distribution in the sound waveform is affirmative, in addition to the first evaluation, it is detected that a breath is inputted into the microphone 43.

On the other hand, in the breath blowing continuing period, as long as the evaluation (the evaluation of step 56 using the threshold value T set in step 88: the second evaluation) based on the frequency distribution in the sound waveform is affirmative, it is detected that a breath is inputted into the microphone 43. Further, in the breath blowing starting period, when it is detected that a substantially strong breath is inputted, in the evaluation (the first evaluation) based on an amplitude represented in the sound waveform (in a cases where the threshold value T is set in step 82), it may be detected that a breath is inputted, without making the second evaluation.

Further, in a case where, in the threshold value calculation process, a threshold value is set in no consideration of the number-of-times-clipping-is-performed CL and the like (that is, when the threshold value T is calculated in only process steps of step 87 to step 89 without performing process steps of step 81 to step 86), when the evaluation is affirmative in the evaluation which is based on the frequency distribution in the sound waveform and which uses a relatively strict threshold value for detecting a breath input, it is detected that a breath is inputted into the microphone 43, in the breath blowing starting period. In other words, when the evaluation (the first evaluation) of step 56 using the threshold value T set in step 89 is affirmative, it is detected that a breath is inputted into the microphone 43. On the other hand, in the breath blowing continuing period, when the evaluation is affirmative in the evaluation which is based on the frequency distribution in the sound waveform and which uses a relatively loose threshold value for detecting that a breath is inputted, it is detected that a breath is inputted into the microphone 43. In other words, when the evaluation (the second evaluation) of step 56 using the threshold value T set in step 88) is affirmative, it is detected that a breath is inputted into the microphone 43.

As described above, in the game apparatus 1 according to the present embodiment, in the breath blowing starting period, in order to detect that an inputted sound is a breath, it is required to affirmatively determine that a breath is inputted, in the first evaluation (for example, an evaluation based on an amplitude represented in a sound waveform). On the other hand, in the breath blowing continuing period, as long as an inputted sound is affirmatively determined as a breath in at least one of the first evaluation and the second evaluation (for example, an evaluation based on a frequency distribution in a sound waveform), it is detected that an inputted sound is a breath. For example, in the breath blowing starting period, it is necessary to blow a strong breath in which the sound waveform represents a predetermined amplitude (gain) or more, whereas, in the breath blowing continuing period, a breath may be detected even when the sound waveform represents an amplitude less than the predetermined amplitude. Thus, criteria for detecting for a breath are different depending on a period in which a breath is to be detected, thereby enabling an appropriate detection of a blown breath. For example, even when a breath having gradually reduced strength continues to be blown, the breath can be appropriately detected. Further, when no breath is blown, it is possible to prevent erroneous detection in which an input, such as an inputted noise or an ambient sound, other than a breath, is detected as a breath.

In the process flow described above, when the number of times an inputted sound is detected as a breath (the number-of-times-breath-is-detected C) is greater than or equal to a predetermined number of times Ct, a process based on the breath input is performed in step 61. However, the process based on the breath input may be performed at another time. For example, the process based on the breath input may be performed immediately after the inputted sound is detected as a breath. In this case, if the process step of step 61 is performed immediately preceding the process step of step 59 (that is, after step 58, and after step 65), the process based on the breath input may be performed immediately after the inputted sound is detected as a breath.

Further, in the above description, the zero cross points, the number of zero cross points, and each time interval between two zero cross points are used to calculate the evaluation value E representing a result of evaluation of a frequency distribution of an inputted sound. However, a result of analyzing a frequency distribution of a sound in another method may be used as the evaluation value. For example, the sound waveform of an inputted sound may be subjected to Fast Fourier Transform (FFT), so as to calculate a spectrum of the inputted sound. A degree to which the calculated spectrum is approximate to a predetermined spectrum of a sound of a breath may be calculated as the evaluation value. In another example, a waveform pattern of a sound of a breath blowing sound (a breath sound) is preset, and a degree to which the stored preset waveform pattern is approximate to a sound waveform of an inputted sound may be calculated as the evaluation value.

Further, in the above description, an amplitude (gain) of a sound signal is used as a parameter for detecting a strength of an inputted sound. However, another parameter may be used. Needles to say, any parameter, which can represent a strength of an inputted sound in a predetermined period (one frame), can be used for a similar process.

Moreover, in the above description, the game apparatus 1 performs the breath detection process. However, at least some of the process steps of the breath detection process may be performed by another apparatus. For example, when a sound input device such as a microphone is provided as a sound input apparatus so as to be separated from the game apparatus 1, the sound input apparatus is provided with a processor for processing a sound signal, so that the sound input apparatus may transmit, to the game apparatus 1, sound data obtained in various process steps. In a first exemplary case, as in the above-described example, a sound signal representing an amplitude (gain) of an inputted sound may be transmitted from the sound input apparatus to the game apparatus 1. In a second exemplary case, the processor of the sound input apparatus may calculate the number of zero cross points and the number of times clipping is performed to be counted in step 53 and each time interval to be calculated in step S71, and the sound input apparatus may transmit data indicating the calculation result to the game apparatus 1. In a third exemplary case, the processor of the sound input apparatus may calculate an evaluation value to be calculated in step 54, and a threshold value to be calculated in step 55, and the sound input apparatus may transmit data indicating the calculation result to the game apparatus 1. As described above, the sound input apparatus may transmit, to the game apparatus 1, sound data obtained in various process steps.

In another example, when the game apparatus 1 is allowed to communicate with another apparatus (for example, a server), the other apparatus may perform at least some of the process steps of the breath detection process. For example, in the above description, the game apparatus 1 performs whole process steps for acquisition of sound data, analysis of the sound data, calculation of the evaluation value, calculation of the threshold value, detection of a breath, and a process based on the breath input. However, the other apparatus may perform some of the process steps. In a first exemplary case, when the other apparatus performs analysis of sound data, calculation of the evaluation value, calculation of the threshold value, and detection of a breath, the game apparatus 1 may transmit the obtained sound data to the other apparatus, and the other apparatus may transmit the breath detection result to the game apparatus 1, thereby realizing a similar breath detection process. In a second exemplary case, when the other apparatus performs analysis of the sound data, calculation of the evaluation value, calculation of the threshold value, detection of a breath, and a process based on the breath input, the game apparatus 1 may transmit the obtained sound data to the other apparatus, so that a similar breath detection process can be realized, and the present invention is applicable to a process in which a virtual space realized by the other apparatus is influenced by a breath (for example, in an online game in which participation in a game processed by the other apparatus is allowed so as to share the game progress). In a third exemplary case, the other apparatus performs a process based on the breath input. In this case, when an inputted sound is detected as a breath, the game apparatus 1 may transmit, to the other apparatus, data indicating the detection result, so that a similar breath detection process can be realized, and the present invention is applicable to a process in which a virtual space realized by the other apparatus is influenced by a breath.

In the embodiment described above, a hand-held game apparatus 1 is used. However, a stationary game apparatus or an information processing apparatus such as a typical personal computer may execute the breath detection program of the present invention, thereby realizing the present invention.

In addition, the shape of the game apparatus 1 is only an example. Further, the shapes of the various operation buttons 14 and the touch panel 13 which are provided on the game apparatus 1, the number of each of the operation buttons 14, and the touch panel 13, and the positions at which each of the operation buttons 14 and the touch panel 13 is mounted are examples only. Needless to say, other shapes, number, and mounting positions may be used in the present invention. Further, the order of the process steps, the coefficients, the threshold values, the mathematical expressions, the setting values, values used for the detection, and the like which are used in the game process described above are only examples. Needless to say, the other order of process steps and other values may be used for realizing the present invention.

While the invention has been described in detail, the foregoing description is in all aspects illustrative and not restrictive. It is understood that numerous other modifications and variations can be devised without departing from the scope of the invention. It should be understood that the scope of the present invention is interpreted only by the scope of the claims. It is also understood that, from the description of specific embodiments of the present invention, the one skilled in the art can easily implement the present invention in the equivalent range based on the description of the present invention and on the common technological knowledge. Further, throughout the specification, it is understood that terms in singular form should include a concept of plurality unless otherwise specified. Thus, it should be understood that articles or adjectives indicating the singular form (for example, "a", "an", "the", and the like in English) include the concept of plurality unless otherwise specified. Further, it should be understood that terms used in the present specification have meanings generally used in the art concerned unless otherwise specified. Therefore, unless otherwise defined, all the jargons and technical terms have the same meanings as those generally understood by one skilled in the art of the present invention. In the event of any confliction, the present specification (including meanings defined herein) has priority.

The storage medium having stored therein the breath detection program and the breath detection apparatus according to the present invention allows a blown breath to be appropriately detected, and are useful as a breath detection apparatus such as a game apparatus which operates based on a result of the breath detection, and a breath detection program included in a game program and the like to be executed by the breath detection apparatus.

What is claimed is:

1. A non-transitory computer-readable storage medium having stored therein a breath detection program executable by a computer processor of a system having one or more computer processor for detecting for a sound inputted into a sound input device, the program causing at least one processor to perform operations, comprising:
   acquiring, from the sound input device, sound data representing a sound signal inputted into the sound input device;
   performing a first evaluation, using the one or more processor, of the sound signal represented by the sound data, by using a first criterion for detecting whether or not the sound inputted into the sound input device is a breath;
   performing a second evaluation, using the one or more processor, of the sound signal represented by the sound data, by using a second criterion which is different from the first criterion; and
   performing a breath detection, using the one or more processor, which detects that a breath is inputted into the sound input device when the first evaluation makes an affirmative evaluation in a first period in which whether or not a breath starts to be blown into the sound input device is determined, and which also detects that a breath is inputted into the sound input device when the second evaluation makes an affirmative evaluation in a second period in which whether or not a breath continues to be blown into the sound input device is determined, the second period being distinct from the first period.

2. A non-transitory computer-readable storage medium having stored therein the breath detection program according to claim 1,
   wherein the first evaluation includes evaluating the sound signal based on a magnitude of a sound represented by the sound signal, and
   wherein the second evaluation includes evaluating the sound signal based on a frequency distribution of the sound represented by the sound signal.

3. A non-transitory computer-readable storage medium having stored therein the breath detection program according to claim 2 further causing at least one processor to perform a third evaluation of the sound signal based on the frequency distribution of the sound represented by the sound signal, by using a third criterion which is different from the first criterion and the second criterion,
   wherein, in the first period, the breath detection further detects that a breath is inputted into the sound input device when each of the first evaluation and the third evaluation makes an affirmative evaluation, and the first evaluation makes the affirmative evaluation based on the magnitude of the sound represented by the sound signal, and the third evaluation makes the affirmative evaluation, based on the frequency distribution of the sound represented by the sound signal, and
   wherein, in the second period, the breath detection detects that a breath is inputted into the sound input device at least when the second evaluation makes an affirmative evaluation, based on the frequency distribution of the sound represented by the sound signal.

4. A non-transitory computer-readable storage medium having stored therein the breath detection program according to claim 2, wherein the second evaluation includes performing a time interval calculation which detects, based on the sound signal, zero cross points in a sound waveform representing the sound inputted into the sound input device for calculating a time interval between continual zero cross points, so as to obtain a plurality of the time intervals, and further causing at least one processor to generate
   a time interval distribution of the plurality of the time intervals calculated by the time interval calculation, and
   perform a variation evaluation, using said one or more processors, which determines whether or not a variation among occurrence numbers in the distribution of the plurality of the time intervals is within a predetermined variation range, and
   wherein the second evaluation further includes making an affirmative evaluation based on the second criterion, when the variation among the occurrence numbers in the distribution of the plurality of the time intervals is within the predetermined variation range.

5. A non-transitory computer-readable storage medium having stored therein the breath detection program according to claim 2, wherein the first evaluation includes making an affirmative evaluation based on the first criterion, when a period in which the magnitude of the sound represented by the sound signal is greater than or equal to a predetermined magnitude is greater than or equal to a predetermined time period.

6. A non-transitory computer-readable storage medium having stored therein the breath detection program according to claim 2,
   wherein the first evaluation includes evaluating the sound signal based on a period in which the magnitude of the sound represented by the sound signal is greater than or equal to a predetermined magnitude, and
   wherein the second evaluation changes a threshold value for evaluating a variation in the frequency distribution of the sound represented by the sound signal, based on the period evaluated by the first evaluation.

7. A non-transitory computer-readable storage medium having stored therein the breath detection program according to claim 6,
   wherein, in a case where the first evaluation affirmatively determines that the period in which the magnitude of the sound represented by the sound signal is greater than or equal to the predetermined magnitude indicates a value greater than or equal to a first threshold value, the second evaluation further includes making an affirmative evaluation based on the second criterion if the variation among occurrence numbers in the frequency distribution of the sound represented by the sound signal indicates a value less than or equal to a second threshold value, and
   wherein, in a case where the first evaluation affirmatively determines that the period in which the magnitude of the sound represented by the sound signal is greater than or equal to the predetermined magnitude indicates a value greater than or equal to a third threshold value greater than the first threshold value, the second evaluation further includes making an affirmative evaluation based on the second criterion if the variation among occurrence numbers in the frequency distribution of the sound represented by the sound signal indicates a value less than or equal to a fourth threshold value greater than the second threshold value.

8. A non-transitory computer-readable storage medium having stored therein the breath detection program according to claim 7, wherein one or more of said computer processors is caused to operate as a zero cross point counter for detecting, based on the sound signal, zero cross points in a sound waveform representing the sound inputted into the sound input device, and for counting the number of the zero cross points in a predetermined period, wherein, in a case where the first evaluation affirmatively determines that the period in which the magnitude of the sound represented by the sound signal is greater than or equal to the predetermined magnitude indicates a value greater than or equal to a fifth threshold value greater than the third threshold value, and the number of the zero cross points counted is greater than or equal to a predetermined number, the second evaluation further includes making an affirmative evaluation based on the second criterion if the variation among occurrence numbers in the frequency distribution of the sound represented by the sound signal is less than or equal to a sixth threshold value greater than the fourth threshold value.

9. A non-transitory computer-readable storage medium having stored therein the breath detection program according to claim 2 further causing at least one processor to operate as a zero cross point counter for detecting, based on the sound signal, zero cross points in a sound waveform representing the sound inputted into the sound input device, and for counting the number of the zero cross points in a predetermined period, wherein the first evaluation includes evaluating the sound signal based on a period in which the magnitude of the sound represented by the sound signal is greater than or equal to a predetermined magnitude, and wherein the breath detection operation detects that a breath is inputted into the sound input device, when the first evaluation affirmatively determines that the period in which the magnitude of the sound represented by the sound signal is greater than or equal to the predetermined magnitude indicates a value greater than or equal to a predetermined threshold value, and the number of the zero cross points counted is greater than or equal to a predetermined number.

10. A non-transitory computer-readable storage medium having stored therein the breath detection program according to claim 2 further causing at least one processor to operate as a zero cross point counter for detecting, based on the sound signal, zero cross points in a sound waveform representing the sound inputted into the sound input device, and for counting the number of the zero cross points in a predetermined period, wherein the second evaluation changes a threshold value for evaluating a variation in the frequency distribution of the sound represented by the sound signal, depending on the number of the zero cross points counted.

11. A non-transitory computer-readable storage medium having stored therein the breath detection program according to claim 4, wherein the variation evaluation includes calculating an evaluation value by accumulating a difference between each of the occurrence numbers and an average of the occurrence numbers in the distribution of the plurality of the time intervals, and detects whether or not the evaluation value is less than or equal to a predetermined threshold value, and wherein the second evaluation further includes making an affirmative evaluation based on the second criterion when the evaluation value is less than or equal to the predetermined threshold value.

12. A breath detection apparatus having one or more processors configured for detecting for a sound inputted into a sound input device, the breath detection apparatus comprising:

sound data sampler that acquires, from the sound input device, sound data representing a sound signal;

first signal evaluator that evaluates, using the one or more processor, the sound signal represented by the sound data, by using a first criterion based on a magnitude of the sound signal for detecting whether or not the sound inputted into the sound input device is a breath;

second signal evaluator, using the one or more processor, that evaluates the sound signal represented by the sound data, by using a second criterion which is different from the first criterion; and breath sound detector, using the one or more processor, that detects that a breath sound is inputted into the sound input device when the first signal evaluator makes an affirmative evaluation, in a first period in which whether or not a breath starts to be blown into the sound input device is determined, and when at least one of the first signal evaluator and the second signal evaluator make an affirmative evaluation, in a second period in which whether or not a breath continues to be blown into the sound input device is determined, the second period being distinct from the first.

13. A non-transitory computer-readable storage medium having stored therein a breath detection program executable by a computer processor of a system having one or more processor for detecting for a sound inputted into a sound input device, the program causing at least one processor to perform operations comprising:

acquiring, from the sound input device, sound data representing a sound signal inputted into the sound input device;

performing a first evaluation, using the one or more processor, of the sound signal represented by the sound data, by using a first criterion for detecting whether or not the sound inputted into the sound input device is a breath, wherein the first evaluation further includes evaluating the sound signal based on a magnitude of a sound represented by the sound signal;

performing a second evaluation, using said one or more processor, of the sound signal represented by the sound data, by using a second criterion which is different from the first criterion; and performing a breath detection, using said one or more processor, which detects that a breath is inputted into the sound input device when the first evaluation makes an affirmative evaluation, in a first period in which whether or not a breath starts to be blown into the sound input device is determined, and when at least one of the first evaluation and the second evaluation make an affirmative evaluation, in a second period in which whether or not a breath continues to be blown into the sound input device is determined, the second period being distinct from the first.

14. A method performed using an information processing apparatus having one or more processors of detecting a breath sound input to a sound input device, the method comprising:

acquiring, using the one or more processors, sound data representing a sound signal from the sound input device;

performing, using the one or more processors, a first evaluation process of the sound data based upon a first criterion applicable within a predetermined first period during which a breath begins to be blown into the sound input device for assessing whether a sound input to the sound input device is a breath sound;

performing, using the one or more processors, a second evaluation process of the sound data based upon a second criterion, the second criterion being different from the first criterion, applicable within a predetermined second period during which a breath continues to be blown into the sound input device, the second period successive to the first period, for assessing whether a sound input to the sound input device is a breath sound; and detecting, using the one or more processors, that a sound input to the sound input device is a breath sound when during the first period the first evaluation process assesses the sound input to be a breath sound and during the second period the first evaluation process or the second evaluation process assess the sound input to be a breath sound.

15. A method according to claim 14, using the one or more processors, wherein the first evaluation process involves evaluating the sound data based on a magnitude of the sound signal.

16. A method according to claim 14, using the one or more processors, wherein the second evaluation process involves evaluating the sound data based on a frequency distribution of the sound signal.

17. A method according to claim 14, using the one or more processors, further comprising performing a third evaluation process for evaluating the sound data using a third criterion which is different from the first criterion and the second criterion and is based on a frequency distribution of the sound signal, wherein within the first predetermined period, a breath is detected as being inputted into the sound input device when each of the first evaluation process and the third evaluation process results in an affirmative determination, and the first evaluation process makes an affirmative determination based upon a magnitude of the sound signal, and the third evaluation process makes an affirmative determination based on the frequency distribution of the sound signal, and wherein, within the second predetermined period, a breath is detected as being inputted into the sound input device when at least the second evaluation results in an affirmative determination based on the frequency distribution of the sound signal.

18. A method according to claim 14 wherein the second evaluation process includes:

detecting zero cross points of a sound signal waveform representing the sound inputted into the sound input device, calculating a time interval between continual zero cross points so as to obtain a plurality of calculated time intervals, generating a time interval distribution of the plurality of the time intervals, and determining whether a variation among occurrence numbers in the distribution of the plurality of the time intervals is within a predetermined variation range; and wherein the second evaluation makes an affirmative determination based on the second criterion when the variation among the occurrence numbers in the distribution of the plurality of the time intervals is within the predetermined variation range.

* * * * *